United States Patent
Han et al.

(10) Patent No.: US 9,036,611 B2
(45) Date of Patent: May 19, 2015

(54) METHOD AND DEVICE FOR PERFORMING HARQ IN A MULTIPLE ANTENNA SYSTEM

(75) Inventors: Seung Hee Han, Gyeongki-do (KR); Jae Hoon Chung, Gyeongki-do (KR); Hyun Soo Ko, Gyeongki-do (KR); Min Seok Noh, Gyeongki-do (KR); Moon Il Lee, Gyeongki-do (KR)

(73) Assignee: LG Electronics Inc., Seoul (KR)

( * ) Notice: Subject to any disclaimer, the term of this patent is extended or adjusted under 35 U.S.C. 154(b) by 456 days.

(21) Appl. No.: 13/510,440

(22) PCT Filed: Nov. 3, 2010

(86) PCT No.: PCT/KR2010/007707
§ 371 (c)(1),
(2), (4) Date: May 17, 2012

(87) PCT Pub. No.: WO2011/062384
PCT Pub. Date: May 26, 2011

(65) Prior Publication Data
US 2012/0250663 A1 Oct. 4, 2012

Related U.S. Application Data

(60) Provisional application No. 61/261,758, filed on Nov. 17, 2009.

(30) Foreign Application Priority Data

Aug. 31, 2010 (KR) ........................ 10-2010-0084881

(51) Int. Cl.
*H04W 72/04* (2009.01)
*H04L 5/00* (2006.01)
(Continued)

(52) U.S. Cl.
CPC ............... *H04L 5/0023* (2013.01); *H04L 1/06* (2013.01); *H04L 1/1861* (2013.01); *H04L 5/0053* (2013.01); *H04L 5/0055* (2013.01)

(58) Field of Classification Search
CPC ......................... H04L 5/0055; H04L 5/0053
USPC ................. 370/394, 329, 476, 336; 455/450; 375/219, 295
See application file for complete search history.

(56) References Cited

U.S. PATENT DOCUMENTS 8,855,073 B2 * 10/2014 Han et al. ................. 370/329
2006/0268883 A1 * 11/2006 Qian et al. ................ 370/394
(Continued)

OTHER PUBLICATIONS

3rd Generation Partnership Project; Technical Specification Group Radio Access Network; Evolved Universal Terrestrial Radio Access (E-UTRA); Physical Channels and Modulation (Release 8), 3GPP TS 36.211 v8.8.0 (Sep. 2009).
(Continued)

*Primary Examiner* — Asad Nawaz
*Assistant Examiner* — Parth Patel
(74) *Attorney, Agent, or Firm* — Morgan, Lewis & Bockius LLP

(57) ABSTRACT

Disclosed are a method and a device for performing HARQ in a multiple antenna system. A terminal transmits uplink data via a plurality of antennas and through a Physical Uplink Shared Channel (PUSCH), and receives an ACK/NACK (Acknowledgement/Non-Acknowledgement) signal indicating whether or not the uplink data has been received, the signal being received via the plurality of antennas and through a PHICH (Physical Hybrid-ARQ Indicator Channel) which corresponds to the PUSCH. A downlink resource to which the PHICH is mapped is determined on the basis of the index ($I_{PRB\_RA}^{lowest\_index}$) of the smallest Physical Resource Block (PRB) among the PRBs to which the PUSCH is mapped, uplink DMRS (Demodulation Reference Signal) cyclic shift parameters ($n_{DMRS}$) and Orthogonal Code Cover (OCC) index.

8 Claims, 24 Drawing Sheets

(51) Int. Cl.
*H04L 1/06* (2006.01)
*H04L 1/18* (2006.01)

(56) References Cited

U.S. PATENT DOCUMENTS

| | | | |
|---|---|---|---|
| 2007/0155390 A1* | 7/2007 | Kodikara Patabandi et al. | 455/450 |
| 2009/0055703 A1* | 2/2009 | Kim et al. | 714/748 |
| 2009/0201863 A1 | 8/2009 | Pi | |
| 2009/0268685 A1* | 10/2009 | Chen et al. | 370/329 |
| 2011/0044259 A1* | 2/2011 | Nimbalker et al. | 370/329 |
| 2011/0096735 A1* | 4/2011 | Damnjanovic et al. | 370/329 |
| 2011/0142075 A1* | 6/2011 | Che et al. | 370/476 |
| 2011/0142107 A1* | 6/2011 | Pan et al. | 375/219 |
| 2011/0243066 A1* | 10/2011 | Nayeb Nazar et al. | 370/328 |
| 2012/0063400 A1* | 3/2012 | Papasakellariou et al. | 370/329 |
| 2012/0106473 A1* | 5/2012 | Tiirola et al. | 370/329 |
| 2012/0182977 A1* | 7/2012 | Hooli et al. | 370/336 |
| 2012/0201327 A1* | 8/2012 | Kim et al. | 375/295 |
| 2012/0275409 A1* | 11/2012 | Han et al. | 370/329 |
| 2012/0320839 A1* | 12/2012 | Noh et al. | 370/329 |

OTHER PUBLICATIONS

3rd Generation Partnership Project; Technical Specification Group Radio Access Network; Evolved Universal Terrestrial Radio Access (E-UTRA); Physical layer procedures (Release 8), 3GPP TS 36.213 v8.8.0 (Sep. 2009).

Phich for LTE-A, 3GPP TSG RAN WG1 meeting #59, Jeju, Korea Nov. 9-13, 2009.

International Search Report issued in corresponding International Application No. PCT/KR2010/007707 mailed Jul. 27, 2011.

* cited by examiner

FIG. 6
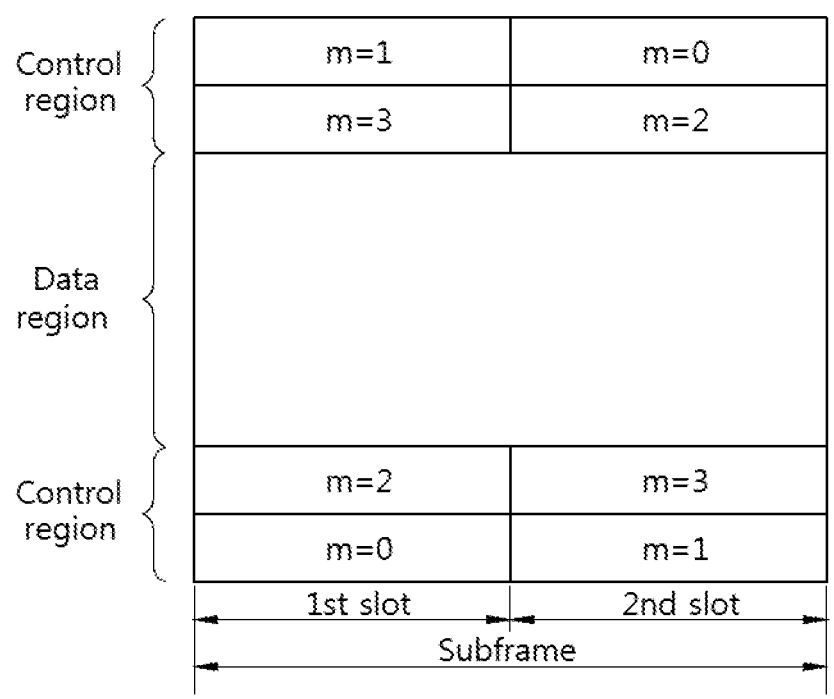
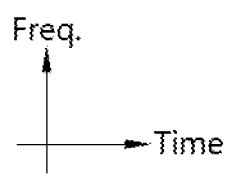

FIG. 13
(a) 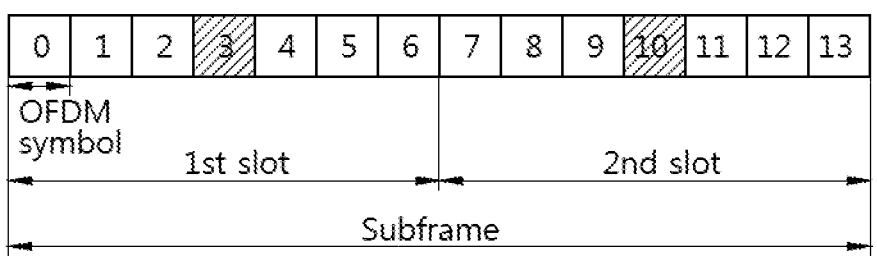
 RS
(b) 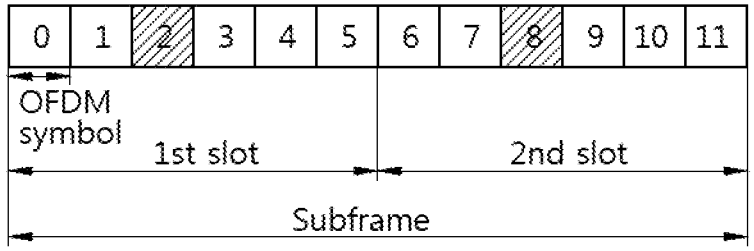
 RS

METHOD AND DEVICE FOR PERFORMING HARQ IN A MULTIPLE ANTENNA SYSTEM

This is a U.S. National Phase Entry of PCT Application No. PCT/KR2010/007707, filed Nov. 3, 2010, and claims the benefit of Korean Patent Application 10-2010-0084881 filed Aug. 31, 2010, and U.S. Provisional Application No. 61/261,758 filed Nov. 17, 2009.

BACKGROUND OF THE INVENTION

1. Field of the Invention

The present invention relates to wireless communication and, more specifically, to a method and apparatus for performing a hybrid automatic repeat request (HARQ) in a multi-antenna system.

2. Related Art

Effective transmission/reception methods and utilizations have been proposed for a broadband wireless communication system to maximize efficiency of radio resources. An orthogonal frequency division multiplexing (OFDM) system capable of reducing inter-symbol interference (ISI) with a low complexity is taken into consideration as one of next generation wireless communication systems. In the OFDM, a serially input data symbol is converted into N parallel data symbols, and is then transmitted by being carried on each of separated N subcarriers. The subcarriers maintain orthogonality in a frequency dimension. Each orthogonal channel experiences mutually independent frequency selective fading, and an interval of a transmitted symbol is increased, thereby minimizing inter-symbol interference.

When a system uses the OFDM as a modulation scheme, orthogonal frequency division multiple access (OFDMA) is a multiple access scheme in which multiple access is achieved by independently providing some of available subcarriers to a plurality of users. In the OFDMA, frequency resources (i.e., subcarriers) are provided to the respective users, and the respective frequency resources do not overlap with one another in general since they are independently provided to the plurality of users. Consequently, the frequency resources are allocated to the respective users in a mutually exclusive manner. In an OFDMA system, frequency diversity for multiple users can be obtained by using frequency selective scheduling, and subcarriers can be allocated variously according to a permutation rule for the subcarriers. In addition, a spatial multiplexing scheme using multiple antennas can be used to increase efficiency of a spatial domain.

MIMO technology can be used to improve the efficiency of data transmission and reception using multiple transmission antennas and multiple reception antennas. MIMO technology may include a space frequency block code (SFBC), a space time block code (STBC), a cyclic delay diversity (CDD), a frequency switched transmit diversity (FSTD), a time switched transmit diversity (TSTD), a precoding vector switching (PVS), spatial multiplexing (SM) for implementing diversity. An MIMO channel matrix according to the number of reception antennas and the number of transmission antennas can be decomposed into a number of independent channels. Each of the independent channels is called a layer or stream. The number of layers is called a rank.

As disclosed in the section 6 of 3GPP (3rd generation partnership project) TS 36.211 V8.8.0 (2009 September) "Technical Specification Group Radio Access Network; Evolved Universal Terrestrial Radio Access (E-UTRA); Physical channels and modulation (Release 8)", examples of downlink control channels used in 3GPP LTE include a physical control format indicator channel (PCFICH), a physical downlink control channel (PDCCH), a physical hybrid-ARQ indicator channel (PHICH), etc. The PCFICH transmitted in a $1^{st}$ OFDM symbol of a subframe carries information regarding the number of OFDM symbols (i.e., a size of a control region) used for transmission of control channels in the subframe. The control information transmitted through the PDCCH is called downlink control information (DCI). The DCI indicates uplink or downlink scheduling information and an uplink transmit power control command for any user equipment (UE) groups. The PHICH carries an acknowledgement (ACK)/non-acknowledgement (NACK) signal for uplink hybrid automatic repeat request (HARQ). That is, the ACK/NACK signal for uplink data transmitted by the UE is transmitted through the PHICH.

A plurality of PHICHs can be allocated according to a system environment. In particular, the plurality of PHICHs needs to be allocated simultaneously in a carrier aggregation system for transmitting data by using a plurality of carriers, a MIMO system, etc. A base station (BS) allocates resources to the plurality of PHICHs, and transmits ACK/NACK through the PHICH.

There is a need for a resource allocation method for preventing PHICH resources from colliding with one another in a multi-user MIMO (MU-MIMO) environment.

SUMMARY OF THE INVENTION

The present invention provides a method and apparatus for performing a hybrid automatic repeat request (HARQ) in a multi-antenna system.

In an aspect, a method of performing a hybrid automatic repeat request (HARQ) in a multi-antenna system is provided. The method includes transmitting uplink data through a plurality of antennas on a physical uplink shared channel (PUSCH), and receiving an acknowledgement/non-acknowledgement (ACK/NACK) signal indicating whether or not the uplink data has been received through the plurality of antennas on a physical hybrid-ARQ indicator channel (PHICH) corresponding to the PUSCH, wherein a downlink resource to which the PHICH is mapped is determined based on an index $I_{PRB\_Ra}^{lowest\_index}$ of a smallest physical resource block (PRB), from among PRBs to which the PUSCH is mapped, an uplink demodulation reference signal (DMRS) cyclic shift parameter $n_{DMRS}$, and an orthogonal code cover (OCC) index. The downlink resource to which the PHICH is mapped may be determined based on Equation $$n_{PHICH}^{group} = (I_{PRB\_RA}^{lowest\_index} + n_{DMRS} + n_{OCC}) \bmod N_{PHICH}^{group} + I_{PHICH} N_{PHICH}^{group}$$

$$n_{PHICH}^{seq} = (\lfloor I_{PRB\_RA}^{lowest\_index} / N_{PHICH}^{group} \rfloor + n_{DMRS} + n_{OCC}) \bmod 2N_{SF}^{PHICH},$$

or may be determined based on Equation $$n_{PHICH}^{group} = ((I_{PRB\_RA}^{lowest\_index} + n_{OCC}) + n_{DMRS}) \bmod N_{PHICH}^{group} + I_{PHICH} N_{PHICH}^{group}$$

$$n_{PHICH}^{seq} = (\lfloor (I_{PRB\_RA}^{lowest\_index} + n_{OCC}) / N_{PHICH}^{group} \rfloor + n_{DMRS}) \bmod 2N_{SF}^{PHICH},$$

where $n_{OCC}$ is the OCC index, $N_{PHICH}^{group}$ is a number of PHICH groups, and N spreading factor (SF). The $n_{OCC}$ may be either 0 or 1. The OCC index may be signalized through a physical downlink control channel (PDCCH) or a radio resource control (RRC) message from a base station or is previously determined. The OCC index may be indicated using 1 bit of a downlink control information (DCI) format 0 transmitted through a PDCCH. The method may further include transmitting retransmission data of the uplink data on the PUSCH through the plurality of antennas.

In another aspect, an apparatus for performing a hybrid automatic repeat request (HARQ) in a multi-antenna system is provided. The apparatus includes a processor for processing uplink data and an acknowledgement/non-acknowledgement (ACK/NACK) signal indicating whether or not the uplink data has been received, and a radio frequency (RF) unit coupled to the processor, wherein the RF unit is configured to transmit the uplink data through a plurality of antennas on a physical uplink shared channel (PUSCH), and receive the ACK/NACK signal indicating whether or not the uplink data has been received through the plurality of antennas on a physical hybrid-ARQ indicator channel (PHICH) corresponding to the PUSCH, wherein a downlink resource to which the PHICH is mapped is determined based on an index $I_{PRB\_RA}^{lowest\_index}$ of a smallest physical resource block (PRB), from among PRBs to which the PUSCH is mapped, an uplink demodulation reference signal (DMRS) cyclic shift parameter $n_{DMRS}$, and an orthogonal code cover (OCC) index.

In another aspect, a method of transmitting an acknowledgement/non-acknowledgement (ACK/NACK) signal in a multi-antenna system is provided. The method includes generating a plurality of physical hybrid-ARQ indicator channel (PHICH) sequences, mapping the plurality of generated PHICH sequences to downlink resources, and transmitting the plurality of mapped PHICH sequences to a plurality of user equipments, wherein the downlink resource is determined based on an index $I_{PRB\_RA}^{lowest\_index}$ of a smallest physical resource block (PRB), from among PRBs to which respective physical uplink shared channel (PUSCH) corresponding to the respective PHICH sequences are mapped and an uplink demodulation reference signal (DMRS) cyclic shift parameter $n_{DMRS}$, and wherein the downlink resource does not overlap with each other. The downlink resources may be determined based on orthogonal code cover (OCC) indices applied to the respective PHICH sequences. The PHICH sequences may be transmitted in different subframes corresponding to the OCC indices. The downlink resources may be determined based on different $n_{DMRS}$.

A hybrid automatic repeat request (HARQ) can be efficiently performed by preventing resources to which a plurality of PHICHs is mapped from colliding with one another.

BRIEF DESCRIPTION OF THE DRAWINGS

FIG. 6 shows the structure of an uplink subframe.

FIG. 13 shows examples of a subframe through which a reference signal is transmitted.

DESCRIPTION OF EXEMPLARY EMBODIMENTS

The following technique may be used for various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like. The CDMA may be implemented as a radio technology such as universal terrestrial radio access (UTRA) or CDMA2000. The TDMA may be implemented as a radio technology such as a global system for mobile communications (GSM)/general packet radio service (GPRS)/enhanced data rates for GSM evolution (EDGE). The OFDMA may be implemented by a radio technology such as institute of electrical and electronics engineers (IEEE) 802.11 (Wi-Fi), IEEE 802.16 (WiMAX), IEEE 802.20, E-UTRA (evolved UTRA), and the like. IEEE 802.16m, an evolution of IEEE 802.16e, provides backward compatibility with a system based on IEEE 802.16e. The UTRA is part of a universal mobile telecommunications system (UMTS). 3GPP (3rd generation partnership project) LTE (long term evolution) is part of an evolved UMTS (E-UMTS) using the E-UTRA, which employs the OFDMA in downlink and the SC-FDMA in uplink. LTE-A (advanced) is an evolution of 3GPP LTE.

Hereinafter, for clarification, LTE-A will be largely described, but the technical concept of the present invention is not meant to be limited thereto.

Figure 1:
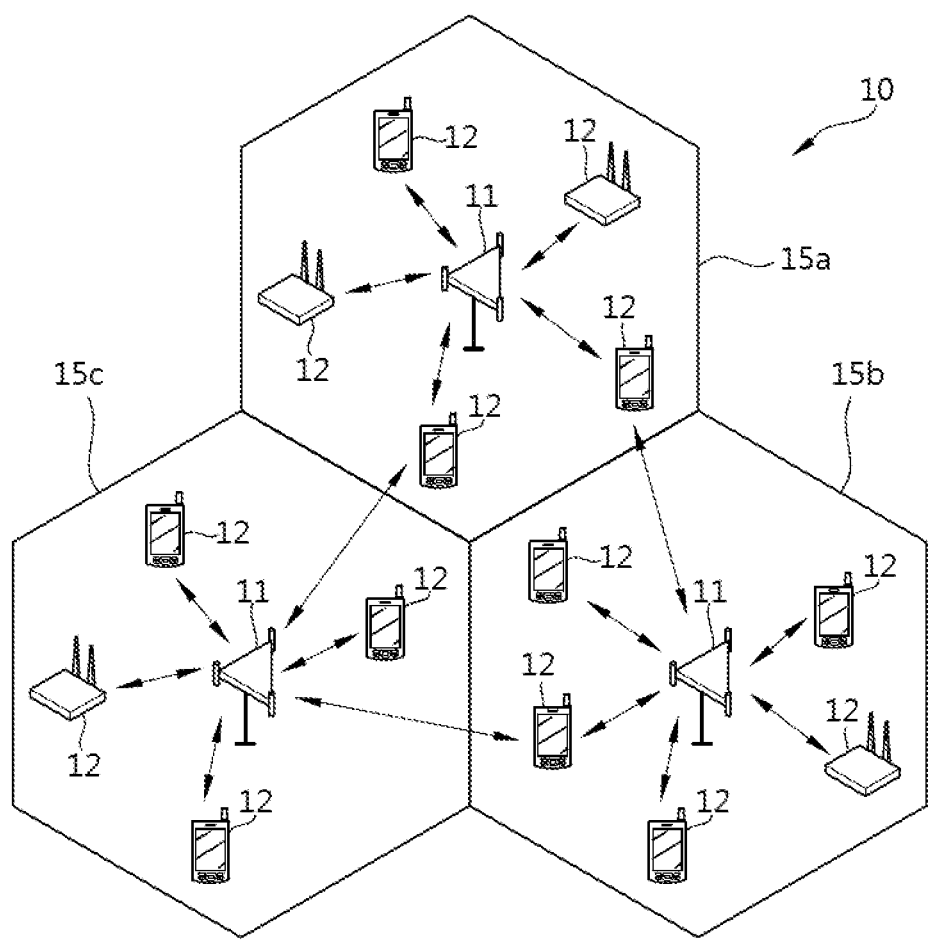
FIG. 1 shows a wireless communication system.

FIG. 1 shows a wireless communication system.

The wireless communication system 10 includes at least one base station (BS) 11. Respective BSs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as MS (mobile station), MT (mobile terminal), UT (user terminal), SS (subscriber station), wireless device, PDA (personal digital assistant), wireless modem, handheld device. The BS 11 generally refers to a fixed station that communicates with the UE 12 and may be called by other names such as eNB (evolved-NodeB), BTS (base transceiver system), access point (AP), etc.

In general, a UE belongs to one cell, and the cell to which a UE belongs is called a serving cell. A BS providing a communication service to the serving cell is called a serving BS. The wireless communication system is a cellular system, so a different cell adjacent to the serving cell exists. The different cell adjacent to the serving cell is called a neighbor cell. A BS providing a communication service to the neighbor cell is called a neighbor BS. The serving cell and the neighbor cell are relatively determined based on a UE.

This technique can be used for downlink or uplink. In general, downlink refers to communication from the BS 11 to the UE 12, and uplink refers to communication from the UE 12 to the BS 11. In downlink, a transmitter may be part of the BS 11 and a receiver may be part of the UE 12. In uplink, a transmitter may be part of the UE 12 and a receiver may be part of the BS 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
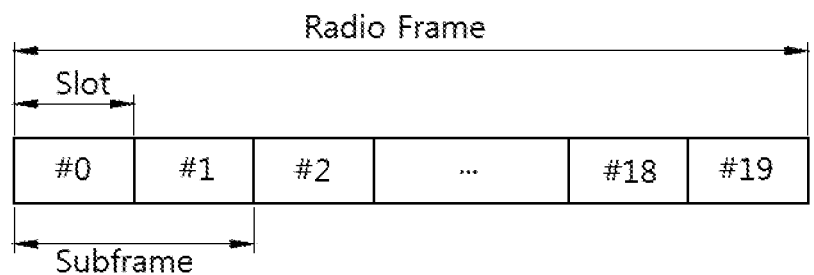
FIG. 2 shows the structure of a radio frame in 3GPP LTE.

FIG. 2 shows the structure of a radio frame in 3GPP LTE.

It may be referred to Paragraph 5 of "Technical Specification Group Radio Access Network; Evolved Universal Terrestrial Radio Access (E-UTRA); Physical channels and modulation (Release 8)" to 3GPP (3rd generation partnership project) TS 36.211 V8.2.0 (2008 March). Referring to FIG. 2, the radio frame includes 10 subframes, and one subframe includes two slots. The slots in the radio frame are numbered by #0 to #19. A time taken for transmitting one subframe is called a transmission time interval (TTI). The TTI may be a scheduling unit for a data transmission. For example, a radio frame may have a length of 10 ms, a subframe may have a length of 1 ms, and a slot may have a length of 0.5 ms.

One slot includes a plurality of orthogonal frequency division multiplexing (OFDM) symbols in a time domain and a plurality of subcarriers in a frequency domain. Since 3GPP LTE uses OFDMA in downlink, the OFDM symbols are used to express a symbol period. The OFDM symbols may be called by other names depending on a multiple-access scheme. For example, when a single carrier frequency division multiple access (SC-FDMA) is in use as an uplink multi-access scheme, the OFDM symbols may be called SC-FDMA symbols. A resource block (RB), a resource allocation unit, includes a plurality of continuous subcarriers in a slot. The structure of the radio frame is merely an example. Namely, the number of subframes included in a radio frame, the number of slots included in a subframe, or the number of OFDM symbols included in a slot may vary.

3GPP LTE defines that one slot includes seven OFDM symbols in a normal cyclic prefix (CP) and one slot includes six OFDM symbols in an extended CP.

The wireless communication system may be divided into a frequency division duplex (FDD) scheme and a time division duplex (TDD) scheme. According to the FDD scheme, an uplink transmission and a downlink transmission are made at different frequency bands. According to the TDD scheme, an uplink transmission and a downlink transmission are made during different periods of time at the same frequency band. A channel response of the TDD scheme is substantially reciprocal. This means that a downlink channel response and an uplink channel response are almost the same in a given frequency band. Thus, the TDD-based wireless communication system is advantageous in that the downlink channel response can be obtained from the uplink channel response. In the TDD scheme, the entire frequency band is time-divided for uplink and downlink transmissions, so a downlink transmission by the BS and an uplink transmission by the UE can be simultaneously performed. In a TDD system in which an uplink transmission and a downlink transmission are discriminated in units of subframes, the uplink transmission and the downlink transmission are performed in different subframes.

Figure 3:
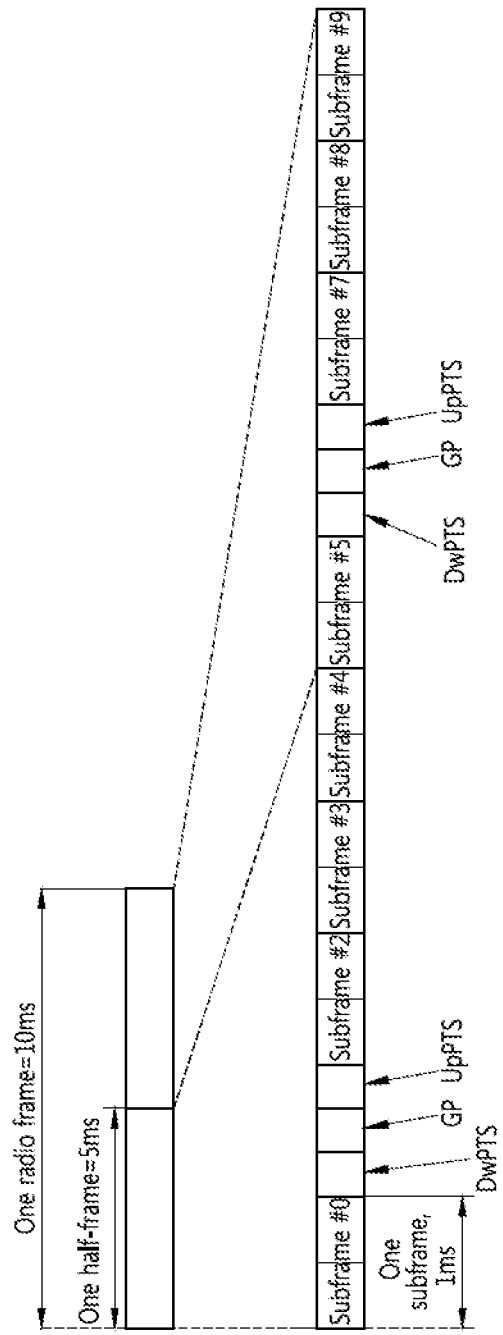
FIG. 3 shows the format of a TDD radio frame in a 3GPP LTE system.

FIG. 3 shows the format of a TDD radio frame in a 3GPP LTE system.

For the format, reference may be made to Paragraph 4.2 of 3GPP TS 36.211 V8.2.0 (2008 March) "Technical Specification Group Radio Access Network; Evolved Universal Terrestrial Radio Access (E-UTRA); Physical Channels and Modulation (Release 8)". One radio frame has a length of 10 ms and consists of two half-frames each having a length of 5 ms. Furthermore, one half-frame consists of 5 subframes each having a length of 1 ms. One subframe is designated as any one of a UL subframe, a DL subframe, and a special subframe. One radio frame includes at least one UL subframe and at least one DL subframe.

The special subframe is a specific period positioned between the UL subframe and the DL subframe for the purpose of UL-DL separation. One radio frame includes at least one special subframe. The special subframe includes a downlink pilot time slot (DwPTS), a guard period (GP), and an uplink pilot time slot (UpPTS). The DwPTS is used for initial cell search, synchronization, or channel estimation. The UpPTS is used for channel estimation in a BS and UL transmission synchronization of a UE. The GP is a guard interval used to remove interference that occurs in UL transmission due to a multi-path delay of a DL signal.

Figure 4:
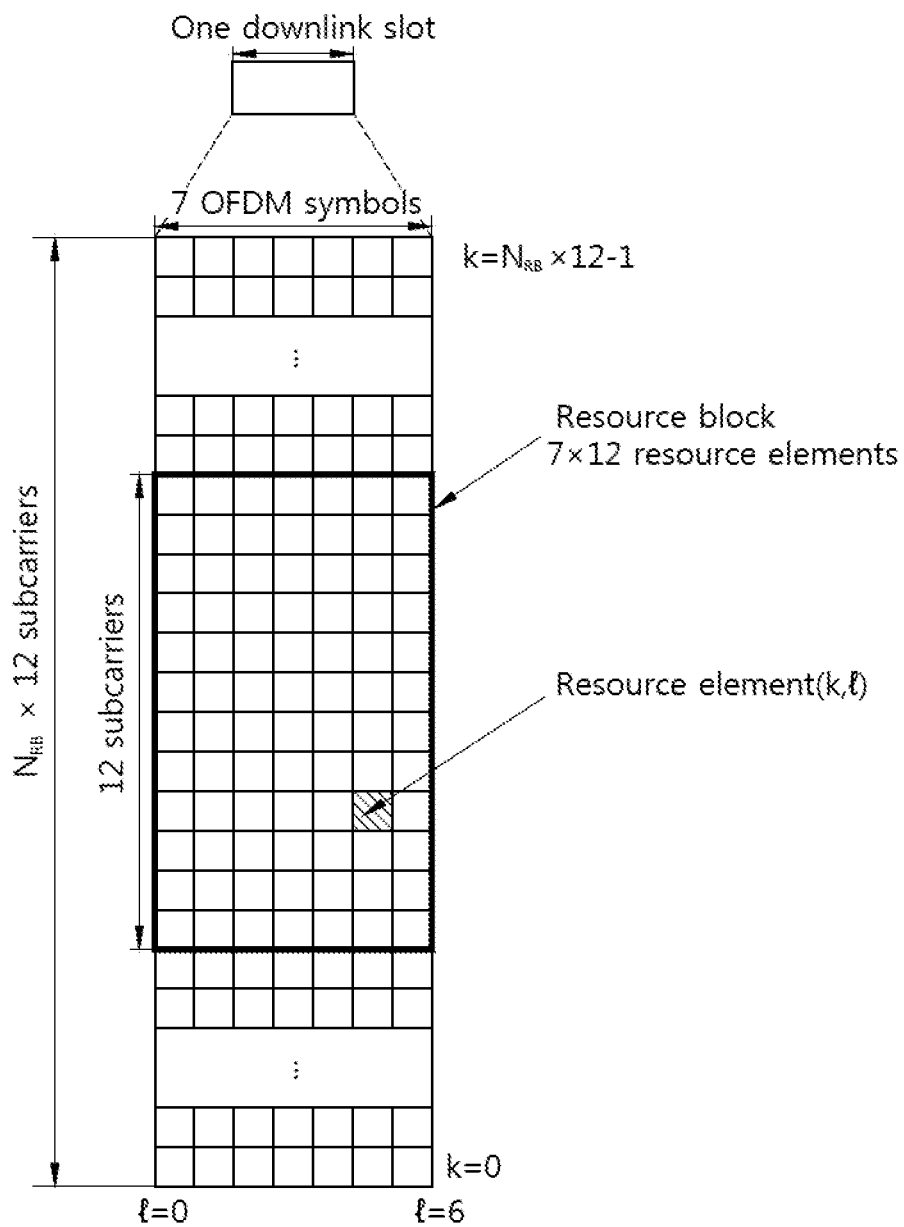
FIG. 4 shows an example of a resource grid of a single downlink slot.

FIG. 4 shows an example of a resource grid of a single downlink slot.

A downlink slot includes a plurality of OFDM symbols in the time domain and $N_{RB}$ number of resource blocks (RBs) in the frequency domain. The $N_{RB}$ number of resource blocks included in the downlink slot is dependent upon a downlink transmission bandwidth set in a cell. For example, in an LTE system, $N_{RB}$ may be any one of 60 to 110. One resource block includes a plurality of subcarriers in the frequency domain. An uplink slot may have the same structure as that of the downlink slot.

Each element on the resource grid is called a resource element. The resource elements on the resource grid can be discriminated by a pair of indexes (k,l) in the slot. Here, k ($k=0, \ldots, N_{RB} \times 12-1$) is a subcarrier index in the frequency domain, and l is an OFDM symbol index in the time domain.

Here, it is illustrated that one resource block includes 7×12 resource elements made up of seven OFDM symbols in the time domain and twelve subcarriers in the frequency domain, but the number of OFDM symbols and the number of subcarriers in the resource block are not limited thereto. The number of OFDM symbols and the number of subcarriers may vary depending on the length of a cyclic prefix (CP), frequency spacing, and the like. For example, in case of a normal CP, the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 5:
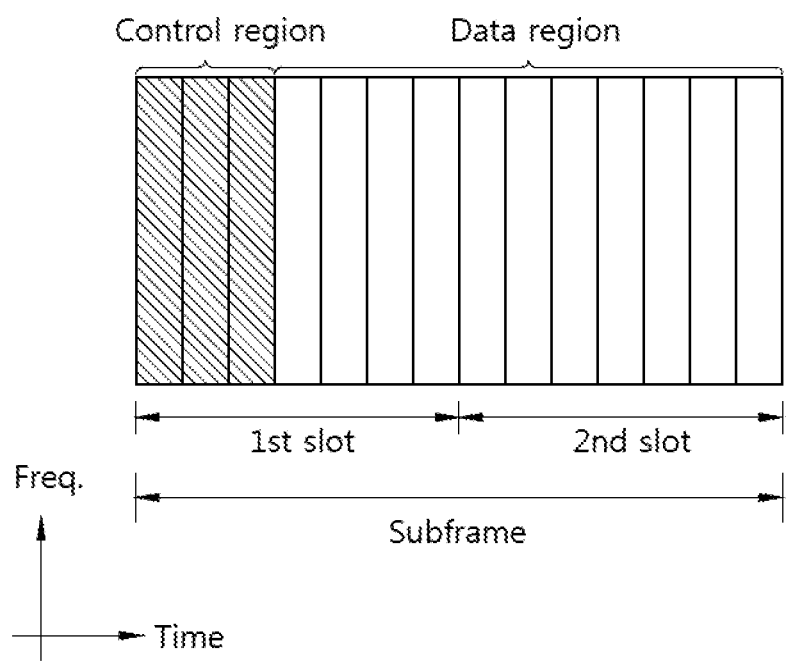
FIG. 5 shows the structure of a downlink subframe.

FIG. 5 shows the structure of a downlink subframe.

A downlink subframe includes two slots in the time domain, and each of the slots includes seven OFDM symbols in the normal CP. First three OFDM symbols (maximum four OFDM symbols with respect to a 1.4 MHz bandwidth) of a first slot in the subframe corresponds to a control region to which control channels are allocated, and the other remaining OFDM symbols correspond to a data region to which a physical downlink shared channel (PDSCH) is allocated.

The PDCCH may carry a transmission format and a resource allocation of a downlink shared channel (DL-SCH), resource allocation information of an uplink shared channel (UL-SCH), paging information on a PCH, system information on a DL-SCH, a resource allocation of an higher layer control message such as a random access response transmitted via a PDSCH, a set of transmission power control commands with respect to individual UEs in a certain UE group, an activation of a voice over interne protocol (VoIP), and the like. A plurality of PDCCHs may be transmitted in the control region, and a UE can monitor a plurality of PDCCHs. The PDCCHs are transmitted on one or an aggregation of a plurality of consecutive control channel elements (CCE). The CCE is a logical allocation unit used to provide a coding rate according to the state of a wireless channel. The CCE corresponds to a plurality of resource element groups. The format of the PDCCH and an available number of bits of the PDCCH are determined according to an associative relation between the number of the CCEs and a coding rate provided by the CCEs.

The BS determines a PDCCH format according to a DCI to be transmitted to the UE, and attaches a cyclic redundancy check (CRC) to the DCI. A unique radio network temporary identifier (RNTI) is masked on the CRC according to the owner or the purpose of the PDCCH. In case of a PDCCH for a particular UE, a unique identifier, e.g., a cell-RNTI (C-RNTI), of the UE, may be masked on the CRC. Or, in case of a PDCCH for a paging message, a paging indication identifier, e.g., a paging-RNTI (P-RNTI), may be masked on the CRC. In case of a PDCCH for a system information block (SIB), a system information identifier, e.g., a system information-RNTI (SI-RNTI), may be masked on the CRC. In order to indicate a random access response, i.e., a response to a transmission of a random access preamble of the UE, a random access-RNTI (RA-RNTI) may be masked on the CRC.

FIG. 6 shows the structure of an uplink subframe.

An uplink subframe may be divided into a control region and a data region in the frequency domain. A physical uplink control channel (PUCCH) for transmitting uplink control information is allocated to the control region. A physical uplink shared channel (PUCCH) for transmitting data is allocated to the data region. The user equipment does not transmit the PUCCH and the PUSCH simultaneously to maintain a single carrier property.

The PUCCH for one UE is allocated in an RB pair. RBs belonging to the RB pair occupy different subcarriers in each of a $1^{st}$ slot and a $2^{nd}$ slot. A frequency occupied by the RBs belonging to the RB pair allocated to the PUCCH changes at a slot boundary. This is called that the RB pair allocated to the PUCCH is frequency-hopped at a slot boundary. Since the UE transmits UL control information over time through different subcarriers, a frequency diversity gain can be obtained. In the figure, m is a location index indicating a logical frequency-domain location of the RB pair allocated to the PUCCH in the subframe.

Uplink control information transmitted on the PUCCH may include a HARQ ACK/NACK, a channel quality indicator (CQI) indicating the state of a downlink channel, a scheduling request (SR) which is an uplink radio resource allocation request, and the like.

The PUSCH is mapped to a uplink shared channel (UL-SCH), a transport channel. Uplink data transmitted on the PUSCH may be a transport block, a data block for the UL-SCH transmitted during the TTI. The transport block may be user information. Or, the uplink data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the uplink data may include only control information.

In an LTE-A system, UL adopts an SC-FDMA transmission scheme. A transmission scheme in which IFFT is performed after DFT spreading is called SC-FDMA. SC-FDMA may also be called a discrete Fourier transform spread (DFT-s) OFDM. In SC-FDMA, the peak-to-average power ratio (PAPR) or a cubic metric (CM) may be lowered. If the SC-FDMA transmission scheme is used, transmission power efficiency in a UE having limited power consumption may be increased because the non-linear distortion period of a power amplifier may be avoided. Consequently, user throughput may be increased.

Figure 7:
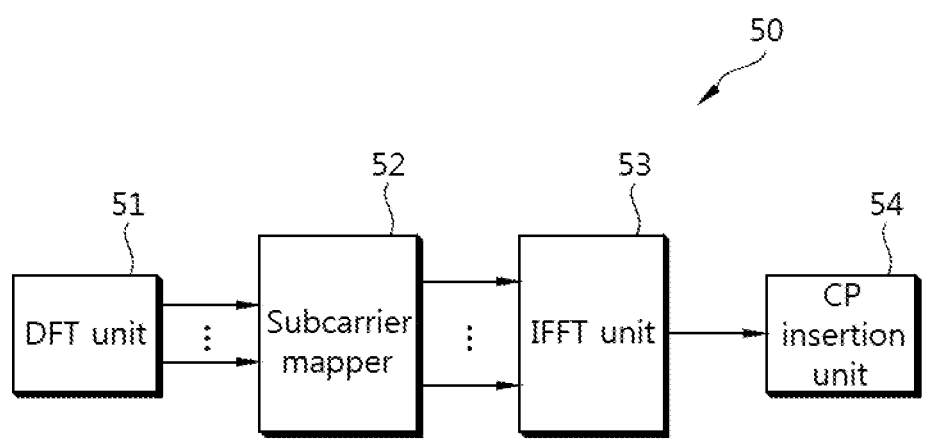
FIG. 7 shows an example of the structure of a transmitter in an SC-FDMA system.

FIG. 7 shows an example of the structure of a transmitter in an SC-FDMA system.

Referring to FIG. 7, the transmitter 50 includes a discrete Fourier transform (DFT) unit 51, a subcarrier mapper 52, an inverse fast Fourier transform (IFFT) unit 53, and a cyclic prefix (CP) insertion unit 54. The transmitter 50 may include a scramble unit (not shown), a modulation mapper (not shown), a layer mapper (not shown), and a layer permutator (not shown), which may be placed in front of the DFT unit 51.

The DFT unit 51 outputs complex-valued symbols by performing DFT on input symbols. For example, when Ntx symbols are input (where Ntx is a natural number), a DFT size is Ntx. The DFT unit 51 may be called a transform precoder. The subcarrier mapper 52 maps the complex-valued symbols to the respective subcarriers of the frequency domain. The complex-valued symbols may be mapped to resource elements corresponding to a resource block allocated for data transmission. The subcarrier mapper 52 may be called a resource element mapper. The IFFT unit 53 outputs a baseband signal for data (that is, a time domain signal) by performing IFFT on the input symbols. The CP insertion unit 54 copies some of the rear part of the baseband signal for data and inserts the copied parts into the former part of the baseband signal for data. Orthogonality may be maintained even in a multi-path channel because inter-symbol interference (ISI) and inter-carrier interference (ICI) are prevented through CP insertion.

Figure 8:
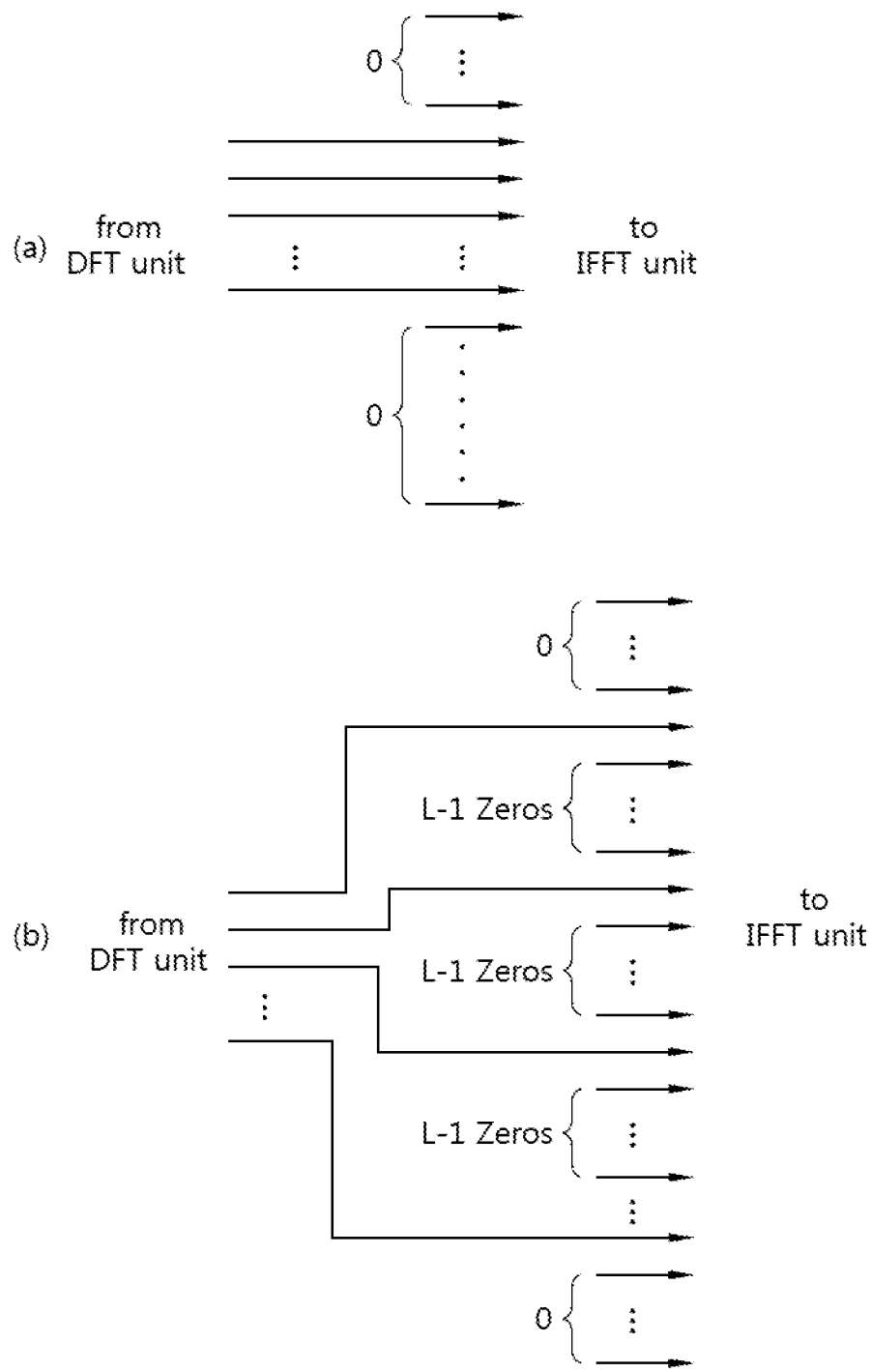
FIG. 8 shows an example of a scheme in which the subcarrier mapper maps the complex-valued symbols to the respective subcarriers of the frequency domain.

FIG. 8 shows an example of a scheme in which the subcarrier mapper maps the complex-valued symbols to the respective subcarriers of the frequency domain.

Referring to FIG. 8(a), the subcarrier mapper maps the complex-valued symbols, outputted from the DFT unit, to subcarriers contiguous to each other in the frequency domain. '0' is inserted into subcarriers to which the complex-valued symbols are not mapped. This is called localized mapping. In a 3GPP LTE system, a localized mapping scheme is used. Referring to FIG. 8(b), the subcarrier mapper inserts an (L-1) number of '0' every two contiguous complex-valued symbols which are outputted from the DFT unit (L is a natural number). That is, the complex-valued symbols outputted from the DFT unit are mapped to subcarriers distributed at equal intervals in the frequency domain. This is called distributed mapping. If the subcarrier mapper uses the localized mapping scheme as in FIG. 8(a) or the distributed mapping scheme as in FIG. 10(b), a single carrier characteristic is maintained.

A clustered DFT-s OFDM transmission scheme is a modification of the existing SC-FDMA transmission scheme and is a method of dividing data symbols, subjected to a precoder, into a plurality of subblocks, separating the subblocks, and mapping the subblocks in the frequency domain.

Figure 9:
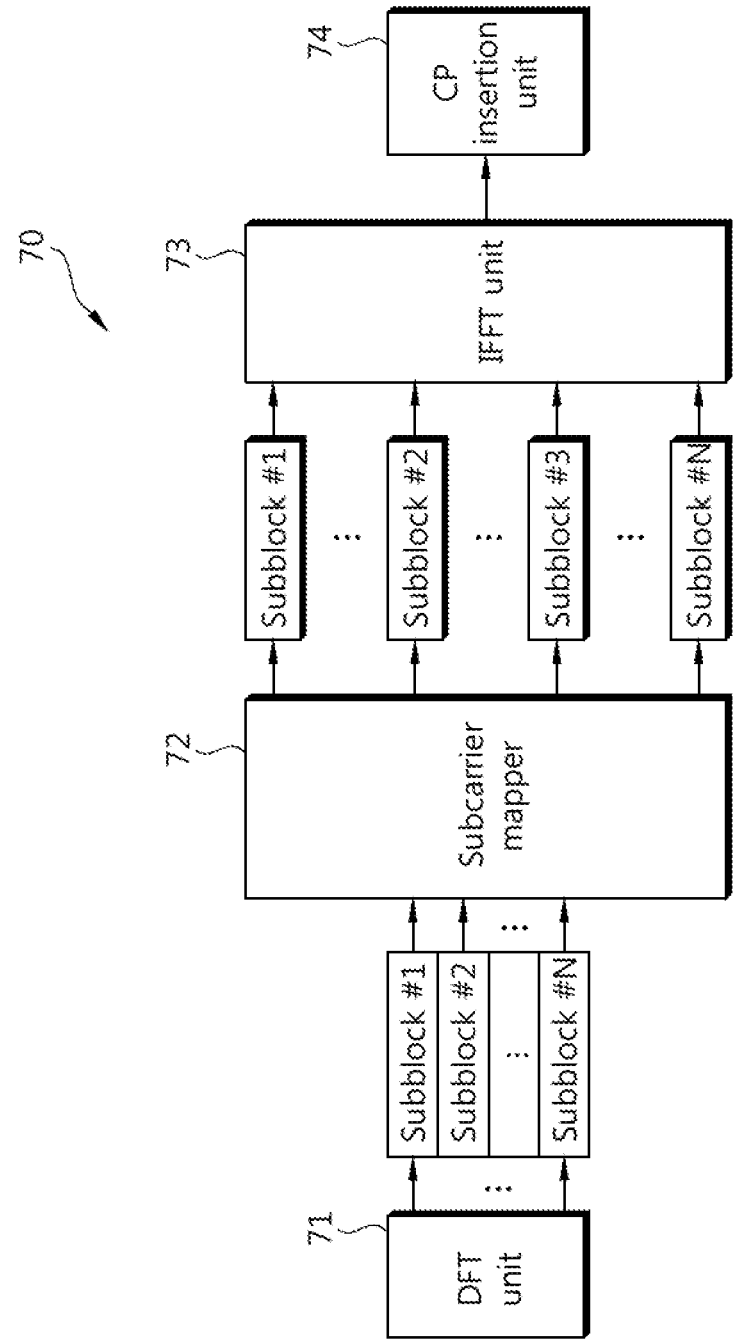
FIG. 9 shows an example of a transmitter using the clustered DFT-s OFDM transmission scheme.

FIG. 9 shows an example of a transmitter using the clustered DFT-s OFDM transmission scheme.

Referring to FIG. 9, the transmitter 70 includes a DFT unit 71, a subcarrier mapper 72, an IFFT unit 73, and a CP insertion unit 74. The transmitter 70 may further include a scramble unit (not shown), a modulation mapper (not shown), a layer mapper (not shown), and a layer permutator (not shown), which may be placed in front of the DFT unit 71.

Complex-valued symbols outputted from the DFT unit 71 are divided into N subblocks (N is a natural number). The N subblocks may be represented by a subblock #1, a subblock #2, ..., a subblock #N. The subcarrier mapper 72 distributes the N subblocks in the frequency domain and maps the N subblocks to subcarriers. The NULL may be inserted every two contiguous subblocks. The complex-valued symbols within one subblock may be mapped to subcarriers contiguous to each other in the frequency domain. That is, the localized mapping scheme may be used within one subblock.

The transmitter 70 of FIG. 9 may be used both in a single carrier transmitter or a multi-carrier transmitter. If the transmitter 70 is used in the single carrier transmitter, all the N subblocks correspond to one carrier. If the transmitter 70 is used in the multi-carrier transmitter, each of the N subblocks may correspond to one carrier. Alternatively, even if the transmitter 70 is used in the multi-carrier transmitter, a plurality of subblocks of the N subblocks may correspond to one carrier. Meanwhile, in the transmitter 70 of FIG. 9, a time domain signal is generated through one IFFT unit 73. Accordingly, in order for the transmitter 70 of FIG. 9 to be used in a multi-carrier transmitter, subcarrier intervals between contiguous carriers in a contiguous carrier allocation situation must be aligned.

Figure 10:
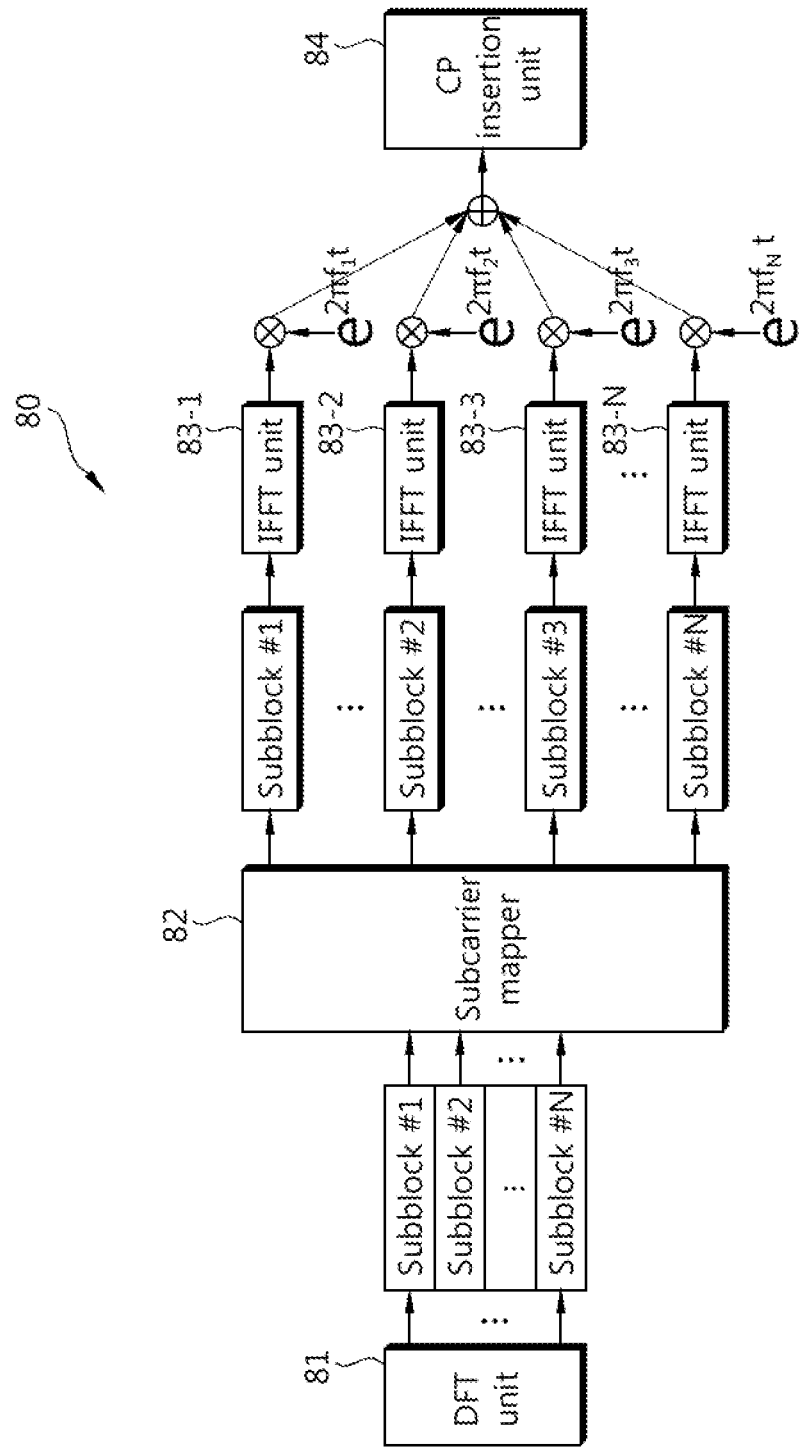
FIG. 10 shows another example of a transmitter using the clustered DFT-s OFDM transmission scheme.

FIG. 10 shows another example of a transmitter using the clustered DFT-s OFDM transmission scheme.

Referring to FIG. 10, the transmitter 80 includes a DFT unit 81, a subcarrier mapper 82, a plurality of IFFT units 83-1, 83-2, ..., 83-N (N is a natural number), and a CP insertion unit 84. The transmitter 80 may further include a scramble unit (not shown), a modulation mapper (not shown), a layer mapper (not shown), and a layer permutator (not shown), which may be placed in front of the DFT unit 71.

IFFT is individually performed on each of N subblocks. An nth IFFT unit 83-n outputs an nth baseband signal (n=1, 2, ..., N) by performing IFFT on a subblock #n. The nth baseband signal is multiplied by an nth carrier signal to produce an nth radio signal. After the N radio signals generated from the N subblocks are added, a CP is inserted by the CP insertion unit 84. The transmitter 80 of FIG. 10 may be used in a discontinuous carrier allocation situation where carriers allocated to the transmitter are not contiguous to each other.

Figure 11:
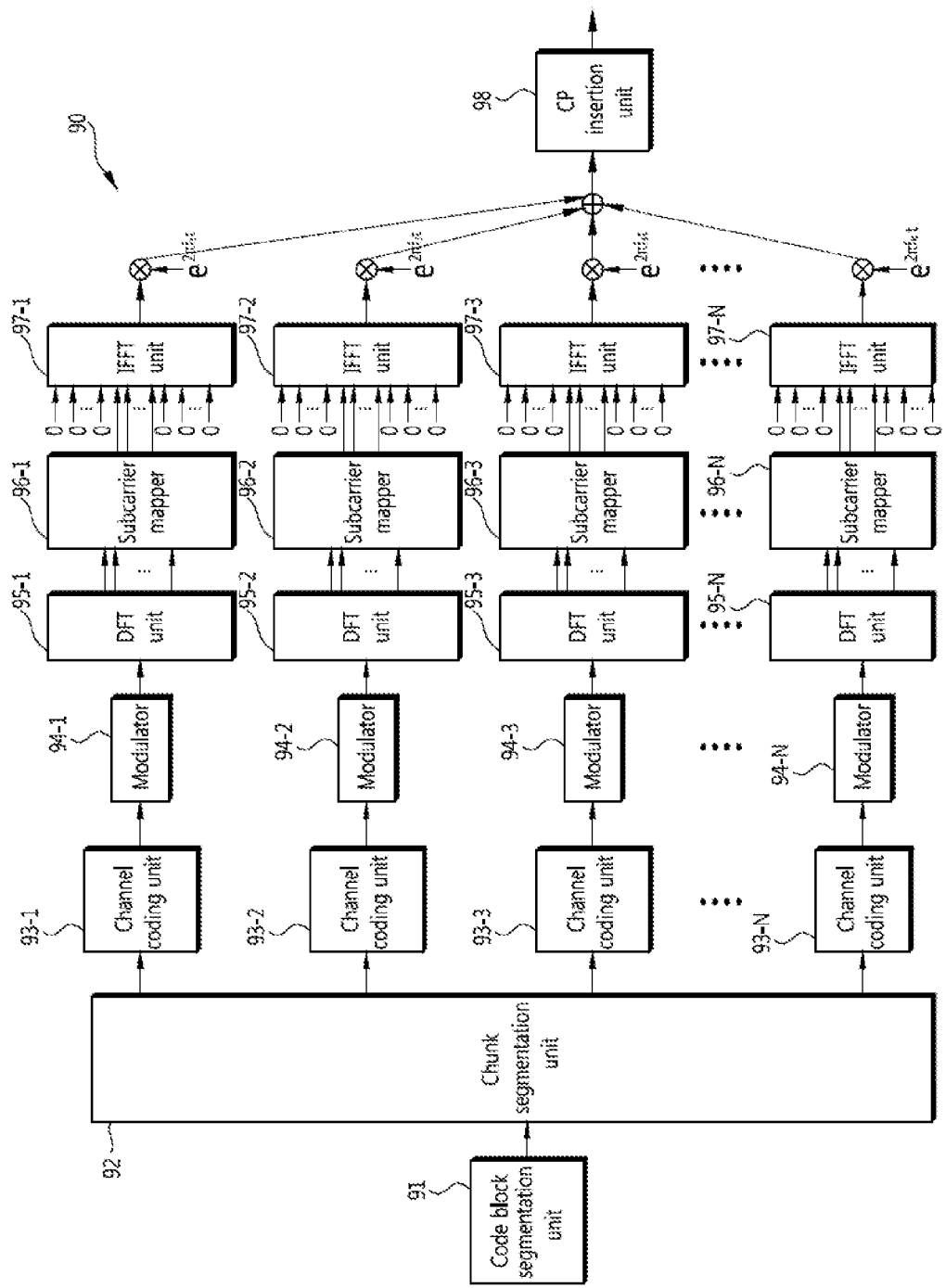
FIG. 11 is another example of a transmitter using the clustered DFT-s OFDM transmission scheme.

FIG. 11 is another example of a transmitter using the clustered DFT-s OFDM transmission scheme.

FIG. 11 is a chunk-specific DFT-s OFDM system performing DFT precoding on a chunk basis. This may be called Nx SC-FDMA. Referring to FIG. 11, the transmitter 90 includes a code block division unit 91, a chunk division unit 92, a plurality of channel coding units 93-1, ..., 93-N, a plurality of modulators 94-1, ..., 94-N, a plurality of DFT units 95-1, ..., 95-N, a plurality of subcarrier mappers 96-1, ..., 96-N, a plurality of IFFT units 97-1, ..., 97-N, and a CP insertion unit 98. Here, N may be the number of multiple carriers used by a multi-carrier transmitter. Each of the channel coding units 93-1, ..., 93-N may include a scramble unit (not shown). The modulators 94-1, ..., 94-N may also be called modulation mappers. The transmitter 90 may further include a layer mapper (not shown) and a layer permutator (not shown) which may be placed in front of the DFT units 95-1, ..., 95-N.

The code block division unit 91 divides a transmission block into a plurality of code blocks. The chunk division unit 92 divides the code blocks into a plurality of chunks. Here, the code block may be data transmitted by a multi-carrier transmitter, and the chunk may be a data piece transmitted through one of multiple carriers. The transmitter 90 performs DFT on a chunk basis. The transmitter 90 may be used in a discontinuous carrier allocation situation or a contiguous carrier allocation situation.

A UL reference signal is described below.

In general, the reference signal is transmitted in the form of a sequence. A specific sequence may be used as the reference signal sequence without a special limit. A phase shift keying (PSK)-based computer generated sequence may be used as the reference signal sequence. Examples of PSK include binary phase shift keying (BPSK) and quadrature phase shift keying (QPSK). Alternatively, a constant amplitude zero auto-correlation (CAZAC) sequence may be used as the reference signal sequence. Examples of the CAZAC sequence include a Zadoff-Chu (ZC)-based sequence, a ZC sequence with cyclic extension, and a ZC sequence with truncation. Alternatively, a pseudo-random (PN) sequence may be used as the reference signal sequence. Examples of the PN sequence include an m-sequence, a computer-generated sequence, a gold sequence, and a Kasami sequence. A cyclically shifted sequence may be used as the reference signal sequence.

A UL reference signal may be divided into a demodulation reference signal (DMRS) and a sounding reference signal (SRS). The DMRS is a reference signal used in channel estimation for the demodulation of a received signal. The DMRS may be associated with the transmission of a PUSCH or PUCCH. The SRS is a reference signal transmitted from a UE to a BS for UL scheduling. The BS estimates an UL channel through the received SRS and uses the estimated UL channel in UL scheduling. The SRS is not associated with the transmission of a PUSCH or PUCCH. The same kind of a basic sequence may be used for the DMRS and the SRS. Meanwhile, in UL multi-antenna transmission, precoding applied to the DMRS may be the same as precoding applied to a PUSCH. Cyclic shift separation is a primary scheme for multiplexing the DMRS. In an LTE-A system, the SRS may not be pre'coded and may be an antenna-specific reference signal.

A reference signal sequence $r_{u,v}^{(\alpha)}(n)$ may be defined based on a basic sequence $b_{u,v}(n)$ and a cyclic shift a according to Equation 1.

$$r_{u,v}^{(\alpha)}(n)=e^{j\alpha n}b_{u,v}(n), 0 \le n < M_{sc}^{RS} \quad \text{<Equation 1>}$$

In Equation 1, $M_{sc}^{RS}(1 \le m \le N_{RB}^{max,UL})$ is the length of the reference signal sequence and $M_{sc}^{RS}=m*N_{sc}^{RB}$. $N_{sc}^{RB}$ is the size of a resource block indicated by the number of subcarriers in the frequency domain. $N_{RB}^{max,UL}$ indicates a maximum value of a UL bandwidth indicated by a multiple of $N_{sc}^{RB}$. A plurality of reference signal sequences may be defined by differently applying a cyclic shift value α from one basic sequence.

A basic sequence $b_{u,v}(n)$ is divided into a plurality of groups. Here, $u \in \{0, 1, \ldots, 29\}$ indicates a group index, and v indicates a basic sequence index within the group. The basic sequence depends on the length $M_{sc}^{RS}$ of the basic sequence. Each group includes a basic sequence (v=0) having a length of $M_{sc}^{RS}$ for m (1≤m≤5) and includes 2 basic sequences (v=0,1) having a length of $M_{sc}^{RS}$ for m (6≤m≤$n_{RB}^{max,UL}$). The sequence group index u and the basic sequence index v within a group may vary according to time as in group hopping or sequence hopping.

Furthermore, if the length of the reference signal sequence is $3N_{sc}^{RB}$ or higher, the basic sequence may be defined by Equation 2.

$$b_{u,v}(n) = x_q(n \bmod N_{ZC}^{RS}), \ 0 \le n < M_{sc}^{RS} \qquad \text{<Equation 2>}$$

In Equation 2, q indicates a root index of a Zadoff-Chu (ZC) sequence. $N_{ZC}^{RS}$ is the length of the ZC sequence and may be a maximum prime number smaller than $M_{sc}^{RS}$.

The ZC sequence having the root index q may be defined by Equation 3.

$$x_q(m) = e^{-j\frac{\pi q m(m+1)}{N_{ZC}^{RS}}}, \ 0 \le m \le N_{ZC}^{RS} - 1 \qquad \langle \text{Equation 3} \rangle$$

q may be given by Equation 4.

$$q = \lfloor \bar{q} + 1/2 \rfloor + v \cdot (-1)^{\lfloor 2\bar{q} \rfloor}$$

$$\bar{q} = N_{ZC}^{RS} \cdot (u+1)/31 \qquad \text{<Equation 4>}$$

If the length of the reference signal sequence is $3N_{sc}^{RB}$ or less, the basic sequence may be defined by Equation 5.

$$b_{u,v}(n) = e^{j\phi(n)\pi/4}, \ 0 \le n \le M_{sc}^{RS} - 1 \qquad \text{<Equation 5>}$$

Table 1 is an example where $\phi(n)$ is defined when $M_{sc}^{RS} = N_{sc}^{RB}$.

TABLE 1

| | $\phi(0), \ldots, \phi(11)$ | | | | | | | | | | | |
|---|---|---|---|---|---|---|---|---|---|---|---|---|
| 0 | -1 | 1 | 3 | -3 | 3 | 3 | 1 | 1 | 3 | 1 | -3 | 3 |
| 1 | 1 | 1 | 3 | 3 | 3 | -1 | 1 | -3 | -3 | 1 | -3 | 3 |
| 2 | 1 | 1 | -3 | -3 | -3 | -1 | -3 | -3 | 1 | -3 | 1 | -1 |
| 3 | -1 | 1 | 1 | 1 | 1 | -1 | -3 | -3 | 1 | -3 | 3 | -1 |
| 4 | -1 | 3 | 1 | -1 | 1 | -1 | -3 | -1 | 1 | -1 | 1 | 3 |
| 5 | 1 | -3 | 3 | -1 | -1 | 1 | 1 | -1 | -1 | 3 | -3 | 1 |
| 6 | -1 | 3 | -3 | -3 | -3 | 3 | 1 | -1 | 3 | 3 | -3 | 1 |
| 7 | -3 | -1 | -1 | -1 | 1 | -3 | 3 | -1 | 1 | -3 | 3 | 1 |
| 8 | 1 | -3 | 3 | 1 | -1 | -1 | -1 | 1 | 1 | 3 | -1 | 1 |
| 9 | 1 | -3 | -1 | 3 | 3 | -1 | -3 | 1 | 1 | 1 | 1 | 1 |
| 10 | -1 | 3 | -1 | 1 | 1 | -3 | -3 | -1 | -3 | -3 | 3 | -1 |
| 11 | 3 | 1 | -1 | -1 | 3 | 3 | -3 | 1 | 3 | 1 | 3 | 3 |
| 12 | 1 | -3 | 1 | 1 | -3 | 1 | 1 | 1 | -3 | -3 | -3 | 1 |
| 13 | 3 | 3 | -3 | 3 | -3 | 1 | 1 | 3 | -1 | -3 | 3 | 3 |
| 14 | -3 | 1 | -1 | -3 | -1 | 3 | 1 | 3 | 3 | 3 | -1 | 1 |
| 15 | 3 | -1 | 1 | -3 | -1 | -1 | 1 | 1 | 3 | 1 | -1 | -3 |
| 16 | 1 | 3 | 1 | -1 | 1 | 3 | 3 | 3 | -1 | -1 | 3 | -1 |
| 17 | -3 | 1 | 1 | 3 | -3 | 3 | -3 | -3 | 3 | 1 | 3 | -1 |
| 18 | -3 | 3 | 1 | 1 | -3 | 1 | -3 | -3 | -1 | -1 | 1 | -3 |
| 19 | -1 | 3 | 1 | 3 | 1 | -1 | -1 | 3 | -3 | -1 | -3 | -1 |
| 20 | -1 | -3 | 1 | 1 | 1 | 1 | 3 | 1 | -1 | 1 | -3 | -1 |
| 21 | -1 | 3 | -1 | 1 | -3 | -3 | -3 | -3 | -3 | 1 | -1 | -3 |
| 22 | 1 | 1 | -3 | -3 | -3 | -3 | -1 | 3 | -3 | 1 | -3 | 3 |
| 23 | 1 | 1 | -1 | -3 | -1 | -3 | 1 | -1 | 1 | 3 | -1 | 1 |
| 24 | 1 | 1 | 3 | 1 | 3 | 3 | -1 | 1 | -1 | -3 | -3 | 1 |
| 25 | 1 | -3 | 3 | 3 | 1 | 3 | 3 | 1 | -3 | -1 | -1 | 3 |
| 26 | 1 | 3 | -3 | -3 | 3 | -3 | 1 | -1 | -1 | 3 | -1 | -3 |
| 27 | -3 | -1 | -3 | -1 | -3 | 3 | 1 | -1 | 1 | 3 | -3 | -3 |
| 28 | -1 | 3 | -3 | 3 | -1 | 3 | 3 | -3 | 3 | 3 | -1 | -1 |
| 29 | 3 | -3 | -3 | -1 | -1 | -3 | -1 | 3 | -3 | 3 | 1 | -1 |

Table 2 is an example where $\phi(n)$ is defined when $M_{sc}^{RS} = 2 \cdot N_{sc}^{RB}$.

TABLE 2

| | $\phi(0), \ldots, \phi(23)$ | | | | | | | | | | | | | | | | | | | | | | | |
|---|---|---|---|---|---|---|---|---|---|---|---|---|---|---|---|---|---|---|---|---|---|---|---|---|
| 0 | -1 | 3 | 1 | -3 | 3 | -1 | 1 | 3 | -3 | 3 | 1 | 3 | -3 | 3 | 1 | 1 | -1 | 1 | 3 | -3 | 3 | -3 | -1 | -3 |
| 1 | -3 | 3 | -3 | -3 | -3 | 1 | -3 | -3 | 3 | -1 | 1 | 1 | 1 | 3 | 1 | -1 | 3 | -3 | -3 | 1 | 3 | 1 | 1 | -3 |
| 2 | 3 | -1 | 3 | 3 | 1 | 1 | -3 | 3 | 3 | 3 | 3 | 1 | -1 | 3 | -1 | 1 | 1 | -1 | -3 | -1 | -1 | 1 | 3 | 3 |
| 3 | -1 | -3 | 1 | 1 | 3 | -3 | 1 | 1 | -3 | -1 | -1 | 1 | 3 | 1 | 3 | 1 | -1 | 3 | 1 | 1 | -3 | -1 | -3 | -1 |
| 4 | -1 | -1 | -1 | -3 | -3 | -1 | 1 | 1 | 3 | 3 | -1 | 3 | -1 | 1 | -1 | -3 | 1 | -1 | -3 | -3 | 1 | -3 | -1 | -1 |
| 5 | -3 | 1 | 1 | 3 | -1 | 1 | 3 | 1 | -3 | 1 | -3 | 1 | 1 | -1 | -1 | 3 | -1 | -3 | 3 | -3 | -3 | -3 | 1 | 1 |
| 6 | 1 | 1 | -1 | -1 | 3 | -3 | -3 | 3 | -3 | 1 | -1 | -1 | 1 | -1 | 1 | 1 | -1 | -3 | -1 | 1 | -1 | 3 | -1 | -3 |
| 7 | -3 | 3 | 3 | -1 | -1 | -3 | -1 | 3 | 1 | 3 | 1 | 3 | 1 | 1 | -1 | 3 | 1 | -1 | 1 | 3 | -3 | -1 | -1 | 1 |
| 8 | -3 | 1 | 3 | -3 | 1 | -1 | -3 | 3 | -3 | 3 | -1 | -1 | -1 | -1 | 1 | -3 | -3 | -3 | 1 | -3 | -3 | -3 | 1 | -3 |
| 9 | 1 | 1 | -3 | 3 | 3 | -1 | -3 | -1 | 3 | -3 | 3 | 3 | 3 | -1 | 1 | 1 | -3 | 1 | -1 | 1 | 1 | -3 | 1 | 1 |
| 10 | -1 | 1 | -3 | -3 | 3 | -1 | 3 | -1 | -1 | -3 | -3 | -3 | -1 | -3 | -3 | 1 | -1 | 1 | 3 | 3 | -1 | 1 | -1 | 3 |
| 11 | 1 | 3 | 3 | -3 | -3 | 1 | 3 | 1 | -1 | -3 | -3 | -3 | 3 | 3 | -3 | 3 | 3 | -1 | -3 | 3 | -1 | 1 | -3 | 1 |
| 12 | 1 | 3 | 3 | 1 | 1 | 1 | -1 | -1 | 1 | -3 | 3 | -1 | 1 | 1 | -3 | 3 | 3 | -1 | -3 | 3 | -3 | -1 | -3 | -1 |
| 13 | 3 | -1 | -1 | -1 | -1 | -3 | -1 | 3 | 3 | 1 | -1 | 1 | 3 | 3 | 3 | -1 | 1 | 1 | -3 | 1 | 3 | -1 | -3 | 3 |
| 14 | -3 | -3 | 3 | 1 | 3 | 1 | -3 | 3 | 1 | 3 | 1 | 1 | 3 | 3 | -1 | -1 | -3 | 1 | -3 | -1 | 3 | 1 | 1 | 3 |
| 15 | -1 | -1 | 1 | -3 | 1 | 3 | -3 | 1 | -1 | -3 | -1 | 3 | 1 | 3 | 1 | -1 | -3 | -3 | -1 | -1 | -3 | -3 | -3 | -1 |
| 16 | -1 | -3 | 3 | -1 | -1 | -1 | -1 | 1 | 1 | -3 | 3 | 1 | 3 | 3 | 1 | -1 | 1 | -3 | 1 | -3 | 1 | 1 | -3 | -1 |
| 17 | 1 | 3 | -1 | 3 | 3 | -1 | -3 | 1 | -1 | -3 | 3 | 3 | 3 | -1 | 1 | 1 | 3 | -1 | -3 | -1 | 3 | -1 | -1 | -1 |
| 18 | 1 | 1 | 1 | 1 | 1 | -1 | 3 | -1 | -3 | 1 | 1 | 3 | -3 | 1 | -3 | -1 | 1 | 1 | -3 | -3 | 3 | 1 | 1 | -3 |
| 19 | 1 | 3 | 3 | 1 | -1 | -3 | 3 | -1 | 3 | 3 | 3 | -3 | 1 | -1 | 1 | -1 | -3 | -1 | 1 | 3 | -1 | 3 | -3 | -3 |
| 20 | -1 | -3 | 3 | -3 | -3 | -3 | -1 | -1 | -3 | -1 | -3 | 3 | 1 | 3 | -3 | -1 | 3 | -1 | 1 | -1 | 3 | -3 | 1 | -1 |
| 21 | -3 | -3 | 1 | 1 | -1 | 1 | -1 | 1 | -1 | 3 | 1 | -3 | -1 | 1 | -1 | 1 | -1 | -1 | 3 | 3 | -3 | -1 | 1 | -3 |
| 22 | -3 | -1 | -3 | 3 | 1 | -1 | -3 | -1 | -3 | -3 | 3 | -3 | 3 | -3 | -1 | 1 | 3 | 1 | -3 | 1 | 3 | 3 | -1 | -3 |
| 23 | -1 | -1 | -1 | -1 | 3 | 3 | 3 | 1 | 3 | 3 | -3 | 1 | 3 | -1 | 3 | -1 | 3 | 3 | -3 | 3 | 1 | -1 | 3 | 3 |
| 24 | 1 | -1 | 3 | 3 | -1 | -3 | 3 | -3 | -1 | -1 | 3 | -1 | 3 | -1 | -1 | 1 | 1 | 1 | 1 | -1 | -1 | -3 | -1 | 3 |
| 25 | 1 | -1 | 1 | -1 | 3 | -1 | 3 | 1 | 1 | -1 | -1 | -3 | 1 | 1 | -3 | 1 | 3 | -3 | 1 | 1 | -3 | -3 | -1 | -1 |
| 26 | -3 | -1 | 1 | 3 | 1 | 1 | -3 | -1 | -1 | -3 | 3 | -3 | 3 | 1 | -3 | 3 | -3 | 1 | -1 | 1 | -3 | 1 | 1 | 1 |
| 27 | -1 | -3 | 3 | 3 | 1 | 1 | 3 | -1 | -3 | -1 | -1 | -1 | 3 | 1 | -3 | -3 | -1 | 3 | -3 | -1 | -3 | -1 | -3 | -1 |
| 28 | -1 | -3 | -1 | -1 | 1 | -3 | -1 | -1 | 1 | -1 | -3 | 1 | 1 | -3 | 1 | -3 | -3 | 3 | 1 | 1 | -1 | 3 | -1 | -1 |
| 29 | 1 | 1 | -1 | -1 | -3 | -1 | 3 | -1 | 3 | -1 | 1 | 3 | 1 | -1 | 3 | 1 | 3 | -3 | -3 | 1 | -1 | -1 | 1 | 3 |

Hopping of a reference signal may be applied as follows.

The sequence group index u of a slot index $n_s$ may be defined based on a group hopping pattern $f_{gh}(n_s)$ and a sequence shift pattern $f_{ss}$ according to Equation 6.

$$u=(f_{gh}(n_s)+f_{ss})\bmod 30 \qquad \text{<Equation 6>}$$

17 different group hopping patterns and 30 different sequence shift patterns may exist. Whether to apply group hopping may be indicated by a higher layer.

A PUCCH and a PUSCH may have the same group hopping pattern. A group hopping pattern $f_{gh}(n_s)$ may be defined by Equation 7.

$$f_{gh}(n_s) = \begin{cases} 0 & \text{if group hopping is disabled} \\ \left(\sum_{i=0}^{7} c(8n_s + i)\cdot 2^i\right)\bmod 30 & \text{if group hopping is enabled} \end{cases} \qquad \text{<Equation 7>}$$

In Equation 7, c(i) is a pseudo random sequence that is a PN sequence and may be defined by a Gold sequence of a length-31. Equation 8 shows an example of a gold sequence c(n).

$$c(n)=(x_1(n+N_c)+x_2(n+N_c))\bmod 2$$

$$x_1(n+31)=(x_1(n+3)+x_1(n))\bmod 2$$

$$x_2(n+31)=(x_2(n+3)+x_2(n+2)+x_2(n+1)+x_1(n))\bmod 2 \qquad \text{<Equation 8>}$$

Here, Nc=1600, $x_1(i)$ is a first m-sequence, and $x_2(i)$ is a second m-sequence. For example, the first m-sequence or the second m-sequence may be initialized according to a cell identifier (ID) for every OFDM symbol, a slot number within one radio frame, an OFDM symbol index within a slot, and the type of a CP. A pseudo random sequence generator may be initialized to $$c_{init} = \left\lfloor \frac{N_{ID}^{cell}}{30} \right\rfloor$$

in the first of each radio frame.

A PUCCH and a PUSCH may have the same sequence shift pattern. The sequence shift pattern of the PUCCH may be $f_{ss}^{PUCCH}=N_{ID}^{cell} \bmod 30$. The sequence shift pattern of the PUSCH may be $f_{ss}^{PUSCH}=(f_{ss}^{PUCCH}+\Delta_{ss})\bmod 30$ and $\Delta_{ss}\in\{0, 1, \ldots, 29\}$ may be configured by a higher layer.

Sequence hopping may be applied to only a reference signal sequence having a length longer than $6N_{sc}^{RB}$. Here, a basic sequence index v within a basic sequence group of a slot index $n_s$ may be defined by Equation 9.

$$v = \begin{cases} c(n_s) & \text{if group hopping is disabled and sequence hopping is enabled} \\ 0 & \text{otherwise} \end{cases} \qquad \text{<Equation 9>}$$

c(i) may be represented by an example of Equation 8. Whether to apply sequence hopping may be indicated by a higher layer. A pseudo random sequence generator may be initialized to $$c_{init} = \left\lfloor \frac{N_{ID}^{cell}}{30} \right\rfloor \cdot 2^5 + f_{ss}^{PUSCH}$$

in the first of each radio frame.

A DMRS sequence for a PUSCH may be defined by Equation 10.

$$r^{PUSCH}(m\cdot M_{sc}^{RS}+n)=r_{u,v}^{(\alpha)}(n) \qquad \text{<Equation 10>}$$

In Equation 10, m=0, 1, ... and n=0, ..., $M_{sc}^{RS}-1$. $M_{sc}^{RS}=M_{sc}^{PUSCH}$.

$\alpha=2\pi n_{cs}/12$, that is, a cyclic shift value is given within a slot, and $n_{cs}$ may be defined by Equation 11.

$$n_{cs}=(n_{DMRS}^{(1)}+n_{DMRS}^{(2)}+n_{PRS}(n_s))\bmod 12 \qquad \text{<Equation 11>}$$

In Equation 11, $n_{DMRS}^{(1)}$ is indicated by a parameter transmitted by a higher layer, and Table 3 shows an example of a corresponding relationship between the parameter and $n_{DMRS}^{(1)}$.

TABLE 3

| Parameter | $n_{DMRS}^{(1)}$ |
|---|---|
| 0 | 0 |
| 1 | 2 |
| 2 | 3 |
| 3 | 4 |
| 4 | 6 |
| 5 | 8 |
| 6 | 9 |
| 7 | 10 |

Back in Equation 11, $n_{DMRS}^{(2)}$ may be defined by a cyclic shift field within a DCI format 0 for a transmission block corresponding to PUSCH transmission. The DCI format is transmitted in a PDCCH. The cyclic shift field may have a length of 3 bits.

Table 4 shows an example of a corresponding relationship between the cyclic shift field and $n_{DMRS}^{(2)}$.

TABLE 4

| Cyclic shift field in DCI format 0 | $n_{DMRS}^{(2)}$ |
|---|---|
| 000 | 0 |
| 001 | 6 |
| 010 | 3 |
| 011 | 4 |
| 100 | 2 |
| 101 | 8 |
| 110 | 10 |
| 111 | 9 |

Table 5 is another example of a corresponding relationship between the cyclic shift field and $n_{DMRS}^{(2)}$.

TABLE 5

| Cyclic shift field in DCI format 0 | $n_{DMRS}^{(2)}$ |
|---|---|
| 000 | 0 |
| 001 | 2 |
| 010 | 3 |
| 011 | 4 |
| 100 | 6 |
| 101 | 8 |
| 110 | 9 |
| 111 | 10 |

If a PDCCH including the DCI format 0 is not transmitted in the same transmission block, if the first PUSCH is semi-persistently scheduled in the same transmission block, or if the first PUSCH is scheduled by a random access response grant in the same transmission block, $n_{DMRS}^{(2)}$ may be 0.

$n_{PRS}(n_s)$ may be defined by Equation 12.

$$n_{PRS}(n_s) = \Sigma_{i=0}^{7} c(8N_{symb}^{UL} \cdot n_s + i) \cdot 2^i \qquad \text{<Equation 12>}$$

c(i) may be represented by the example of Equation 8 and may be applied in a cell-specific way of c(i). A pseudo random sequence generator may be initialized to $$c_{init} = \left\lfloor \frac{N_{ID}^{cell}}{30} \right\rfloor \cdot 2^5 + f_{SS}^{PUSCH}$$

in the first of each radio frame.

A DMRS sequence $r^{PUSCH}$ is multiplied by an amplitude scaling factor $\beta_{PUSCH}$ and mapped to a physical transmission block, used in relevant PUSCH transmission, from $r^{PUSCH}(0)$ in a sequence starting. The DMRS sequence is mapped to a fourth OFDM symbol (OFDM symbol index 3) in case of a normal CP within one slot and mapped to a third OFDM symbol (OFDM symbol index 2) within one slot in case of an extended CP.

Figure 12:
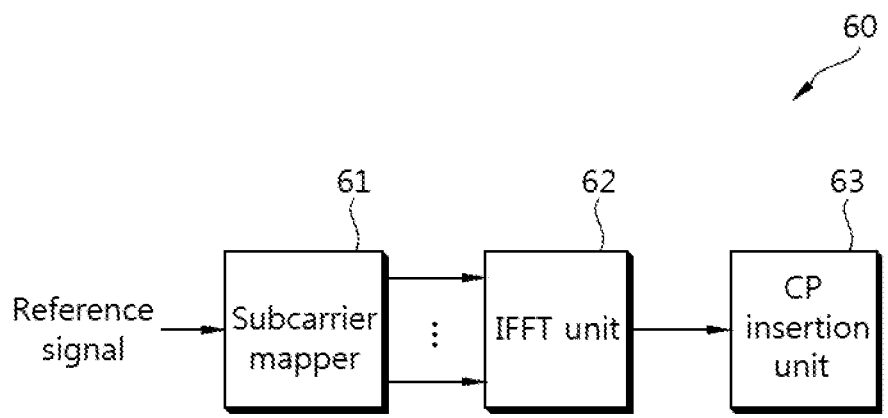
FIG. 12 shows an example of the structure of a reference signal transmitter for demodulation.

FIG. 12 shows an example of the structure of a reference signal transmitter for demodulation.

Referring to FIG. 12 the reference signal transmitter 60 includes a subcarrier mapper 61, an IFFT unit 62, and a CP insertion unit 63. Unlike the transmitter 50 of FIG. 7, in the reference signal transmitter 60, a reference signal is directly generated in the frequency domain without passing through the DFT unit 51 and then mapped to subcarriers through the subcarrier mapper 61. Here, the subcarrier mapper may map the reference signal to the subcarriers using the localized mapping scheme of FIG. 8(a).

FIG. 13 shows examples of a subframe through which a reference signal is transmitted.

The structure of the subframe in FIG. 13(a) shows a case of a normal CP. The subframe includes a first slot and a second slot. Each of the first slot and the second slot includes 7 OFDM symbols. The 14 OFDM symbols within the subframe are assigned respective symbol indices 0 to 13. A reference signal may be transmitted through the OFDM symbols having the symbol indices 3 and 10. Data may be transmitted through the remaining OFDM symbols other than the OFDM symbols through which the reference signal is transmitted. The structure of a subframe in FIG. 13(b) shows a case of an extended CP. The subframe includes a first slot and a second slot. Each of the first slot and the second slot includes 6 OFDM symbols. The 12 OFDM symbols within the subframe are assigned symbol indices 0 to 11. A reference signal is transmitted through the OFDM symbols having the symbol indices 2 and 8. Data is transmitted through the remaining OFDM symbols other than the OFDM symbols through which the reference signal is transmitted. Even though it is not shown in FIG. 13, a sounding reference signal (SRS) may be transmitted through OFDM symbols in the subframe.

Hereinafter, a sounding reference signal (SRS) is described. An SRS is a reference signal transmitted from UE or a relay station to a BS and is a reference signal not related to uplink data or control signal transmission. An SRS is commonly used for channel quality estimation for frequency selective scheduling in UL, but may be used for other purposes. For example, an SRS may be used for power control or the selection of the initial MCS, the initial power control for data transmission, etc. In general, an SRS is transmitted in the last SC-FDMA symbol of one subframe.

A SRS sequence $r_{SRS}(n) = r_{u,v}^{(\alpha)}(n)$ is defined. $r_{u,v}^{(\alpha)}(n)$ is a sequence determined by Equation 1. u indicates a PUCCH sequence group index, and v indicates a basic sequence index. A cyclic shift value $\alpha$ is defined by Equation 13.

$$\alpha = 2\pi \frac{n_{SRS}^{cs}}{8} \qquad \text{<Equation 13>}$$

$n_{SRS}^{cs}$ is a value configured by a high layer for each UE and may be any one of integers from 0 to 7.

The SRS sequence is multiplied by $\beta_{SRS}$, that is, an amplitude scaling factor in order to satisfy transmission power $P_{SRS}$ and then mapped to a resource element. The SRS sequence may be mapped to a resource element (k,l) according to Equation 14, starting from $r_{SRS}(0)$.

$$a_{2k+k_0,l} = \begin{cases} \beta_{SRS} r^{SRS}(k) & k = 0, 1, \ldots, M_{sc,b}^{RS} - 1 \\ 0 & \text{otherwise} \end{cases} \qquad \text{<Equation 14>}$$

In Equation 14, $k_0$ is a starting position in the frequency domain of the SRS, and $M_{sc,b}^{RS}$ is the length of the SRS sequence defined by Equation 15.

$$M_{sc,b}^{RS} = m_{SRS,b} N_{sc}^{RB}/2 \qquad \text{<Equation 15>}$$

In Equation 15, $m_{SRS,b}$ may be given by Table 6 to 9 to be described later for each uplink bandwidth $N_{RB}^{UL}$.

In Equation 14, $k_0$ may be defined by Equation 16.

$$k_0 = k'_0 + \sum_{b=0}^{B_{SRS}} 2M_{sc,b}^{RS} n_b \qquad \text{<Equation 16>}$$

In Equation 16, $k_0'$ is given by $k'_0 = (\lfloor N_{RB}^{UL}/2 \rfloor - m_{SRS,0}/2) N_{SC}^{RB} + k_{TC}$ in a normal UL subframe. $k_{TC} \in \{0,1\}$ is a parameter given to OE by a high layer, and $n_b$ is a frequency position index.

Frequency hopping of an SRS is configured by a parameter $b_{hop} \in \{0, 1, 2, 3\}$ given by a high layer. If frequency hopping of an SRS is not possible ($b_{hop} \geq B_{SRS}$), the frequency hopping is given as a constant of a frequency position index $n_b = \lfloor 4n_{RRC}/m_{SRS,b} \rfloor \mod N_b$. Here, $n_{RRC}$ is given by a high layer. If frequency hopping of an SRS is possible ($b_{hop} < B_{SRS}$), the frequency position index $n_b$ may be determined by Equation 17.

$$n_b = \begin{cases} \lfloor 4n_{RRC}/m_{SRS,b} \rfloor \mod N_b & b \leq b_{hop} \\ \{F_b(n_{SRS}) + \lfloor 4n_{RRC}/m_{SRS,b} \rfloor\} \mod N_b & \text{otherwise} \end{cases} \qquad \text{<Equation 17>}$$

$N_b$ is determined by Table 6 to 9, and $F_b(n_{SRS})$ may be determined by Equation 18.

$$F_b(n_{SRS}) = \begin{cases} (N_b/2) \left\lfloor \frac{n_{SRS} \mod \prod_{b'=b_{hop}}^{b} N_{b'}}{\prod_{b'=b_{hop}}^{b-1} N_{b'}} \right\rfloor + \left\lfloor \frac{n_{SRS} \mod \prod_{b'=b_{hop}}^{b} N_{b'}}{2 \prod_{b'=b_{hop}}^{b-1} N_{b'}} \right\rfloor & \text{if } N_b \text{ even} \\ \lfloor N_b/2 \rfloor \lfloor n_{SRS} / \prod_{b'=b_{hop}}^{b-1} N_{b'} \rfloor & \text{if } N_b \text{ odd} \end{cases} \qquad \text{<Equation 18>}$$

In Equation 18, $n_{SRS}$ indicates the number of times of UE-specific SRS transmission and may be determined by Equation 19.

$$n_{SRS} = \begin{cases} 2N_{SP}n_f + 2(N_{SP}-1)\left\lfloor\frac{n_s}{10}\right\rfloor + \left\lfloor\frac{T_{offset}}{T_{offset\_max}}\right\rfloor & \text{for 2 ms SRS periodicity of frame structure 2} \\ \lfloor(n_f \times 10 + \lfloor n_s/2\rfloor)/T_{SRS}\rfloor, & \text{otherwise} \end{cases}$$

⟨Equation 19⟩

In Equation 19, $T_{SRS}$ indicates a UE-specific periodicity of SRS transmission, $T_{offset}$ indicates an SRS subframe offset, and $T_{offset\_max}$ indicates a maximum value of the $T_{offset}$ value for a specific configuration of the SRS subframe offset. $T_{SRS}$ and $T_{offset}$ may be given by Table 12 and Table 13 to be described later.

Tables 6 to 9 show examples of an SRS bandwidth configuration. A cell-specific parameter of 3 bits may be broadcasted in order to indicate one of 8 bandwidth configurations. Furthermore, a UE-specific parameter of 2 bits may be given by a high layer in order to indicate one of 4 bandwidth configurations.

Table 6 is an example of $m_{SRS,b}$ and $N_b$ (where b=0, 1, 2, 3) when the uplink bandwidth $N_{RB}^{UL}$ is within the range of $6 \leq N_{RB}^{UL} \leq 40$.

TABLE 6

| SRS bandwidth configuration | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 36 | 1 | 12 | 3 | 4 | 3 | 4 | 1 |
| 1 | 32 | 1 | 16 | 2 | 8 | 2 | 4 | 2 |
| 2 | 24 | 1 | 4 | 6 | 4 | 1 | 4 | 1 |
| 3 | 20 | 1 | 4 | 5 | 4 | 1 | 4 | 1 |
| 4 | 16 | 1 | 4 | 4 | 4 | 1 | 4 | 1 |
| 5 | 12 | 1 | 4 | 3 | 4 | 1 | 4 | 1 |
| 6 | 8 | 1 | 4 | 2 | 4 | 1 | 4 | 1 |
| 7 | 4 | 1 | 4 | 1 | 4 | 1 | 4 | 1 |

Table 7 is an example of $m_{SRS,b}$ and $N_b$ (where b=0, 1, 2, 3) when the uplink bandwidth $N_{RB}^{UL}$ is within the range of $40 \leq N_{RB}^{UL} \leq 60$.

TABLE 7

| SRS bandwidth configuration | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 48 | 1 | 24 | 2 | 12 | 2 | 4 | 3 |
| 1 | 48 | 1 | 16 | 3 | 8 | 2 | 4 | 2 |
| 2 | 40 | 1 | 20 | 2 | 4 | 5 | 4 | 1 |
| 3 | 36 | 1 | 12 | 3 | 4 | 3 | 4 | 1 |
| 4 | 32 | 1 | 16 | 2 | 8 | 2 | 4 | 2 |
| 5 | 24 | 1 | 4 | 6 | 4 | 1 | 4 | 1 |
| 6 | 20 | 1 | 4 | 5 | 4 | 1 | 4 | 1 |
| 7 | 16 | 1 | 4 | 4 | 4 | 1 | 4 | 1 |

Table 8 is an example of $m_{SRS,b}$ and $N_b$ (where b=0, 1, 2, 3) when the uplink bandwidth $N_{RB}^{UL}$ is within the range of $60 \leq N_{RB}^{UL} \leq 80$.

TABLE 8

| SRS bandwidth configuration | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 72 | 1 | 24 | 3 | 12 | 2 | 4 | 3 |
| 1 | 64 | 1 | 32 | 2 | 16 | 2 | 4 | 4 |
| 2 | 60 | 1 | 20 | 3 | 4 | 5 | 4 | 1 |
| 3 | 48 | 1 | 24 | 2 | 12 | 2 | 4 | 3 |
| 4 | 48 | 1 | 16 | 3 | 8 | 2 | 4 | 2 |
| 5 | 40 | 1 | 20 | 2 | 4 | 5 | 4 | 1 |
| 6 | 36 | 1 | 12 | 3 | 4 | 3 | 4 | 1 |
| 7 | 32 | 1 | 16 | 2 | 8 | 2 | 4 | 2 |

Table 9 is an example of $m_{SRS,b}$ and $N_b$ (where b=0, 1, 2, 3) when the uplink bandwidth $N_{RB}^{UL}$ is within the range of $80 \leq N_{RB}^{UL} \leq 110$.

TABLE 9

| SRS bandwidth configuration | SRS-Bandwidth $B_{SRS}=0$ | | SRS-Bandwidth $B_{SRS}=1$ | | SRS-Bandwidth $B_{SRS}=2$ | | SRS-Bandwidth $B_{SRS}=3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 96 | 1 | 48 | 2 | 24 | 2 | 4 | 6 |
| 1 | 96 | 1 | 32 | 3 | 16 | 2 | 4 | 4 |
| 2 | 80 | 1 | 40 | 2 | 20 | 2 | 4 | 5 |
| 3 | 72 | 1 | 24 | 3 | 12 | 2 | 4 | 3 |
| 4 | 64 | 1 | 32 | 2 | 16 | 2 | 4 | 4 |
| 5 | 60 | 1 | 20 | 3 | 4 | 5 | 4 | 1 |
| 6 | 48 | 1 | 24 | 2 | 12 | 2 | 4 | 3 |
| 7 | 48 | 1 | 16 | 3 | 8 | 2 | 4 | 2 |

In Tables 6 to 9, $C_{SRS} \in \{0, 1, 2, 3, 4, 5, 6, 7\}$, that is, a cell-specific parameter and $B_{SRS} \in \{0, 1, 2, 3\}$, that is, a UE-specific parameter are given by a high layer.

Tables 10 and 11 are examples of a cell-specific subframe configuration periodicity parameter $T_{SFC}$ and a cell-specific subframe offset parameter $\Delta_{SFC}$ for SRS transmission.

Table 10 is an example of SRS subframe configurations in an FDD system. In accordance with Table 10, the SRS subframe configuration may be indicated by a parameter of 4 bits in length, and the periodicity of the SRS subframe may become any one of 1, 2, 5, and 10 subframes.

TABLE 10

| srsSubframeConfiguration | Binary | Configuration Period $T_{SFC}$ (subframes) | Transmission Offset $\Delta_{SFC}$ (subframes) |
|---|---|---|---|
| 0 | 0000 | 1 | {0} |
| 1 | 0001 | 2 | {0} |
| 2 | 0010 | 2 | {1} |
| 3 | 0011 | 5 | {0} |
| 4 | 0100 | 5 | {1} |
| 5 | 0101 | 5 | {2} |
| 6 | 0110 | 5 | {3} |
| 7 | 0111 | 5 | {0, 1} |
| 8 | 1000 | 5 | {2, 3} |
| 9 | 1001 | 10 | {0} |
| 10 | 1010 | 10 | {1} |
| 11 | 1011 | 10 | {2} |
| 12 | 1100 | 10 | {3} |

TABLE 10-continued

| srsSubframeConfiguration | Binary | Configuration Period $T_{SFC}$ (subframes) | Transmission Offset $\Delta_{SFC}$ (subframes) |
|---|---|---|---|
| 13 | 1101 | 10 | {0, 1, 2, 3, 4, 6, 8} |
| 14 | 1110 | 10 | {0, 1, 2, 3, 4, 5, 6, 8} |
| 15 | 1111 | reserved | reserved |

Table 11 is an example of SRS subframe configurations in a TDD system.

TABLE 11

| srsSubframeConfiguration | Binary | Configuration Period $T_{SFC}$ (subframes) | Transmission offset $\Delta_{SFC}$ (subframes) |
|---|---|---|---|
| 0 | 0000 | 5 | {1} |
| 1 | 0001 | 5 | {1, 2} |
| 2 | 0010 | 5 | {1, 3} |
| 3 | 0011 | 5 | {1, 4} |
| 4 | 0100 | 5 | {1, 2, 3} |
| 5 | 0101 | 5 | {1, 2, 4} |
| 6 | 0110 | 5 | {1, 3, 4} |
| 7 | 0111 | 5 | {1, 2, 3, 4} |
| 8 | 1000 | 10 | {1, 2, 6} |
| 9 | 1001 | 10 | {1, 3, 6} |
| 10 | 1010 | 10 | {1, 6, 7} |
| 11 | 1011 | 10 | {1, 2, 6, 8} |
| 12 | 1100 | 10 | {1, 3, 6, 9} |
| 13 | 1101 | 10 | {1, 4, 6, 7} |
| 14 | 1110 | reserved | reserved |
| 15 | 1111 | reserved | reserved |

When UE sends an SRS, transmission power $P_{SRS}$ may be determined by Equation 20.

$$P_{SRS}(i) = \min\{P_{CMAX} - P_{SRS\_OFFSET} + 10 \log_{10}(M_{SRS}) + P_{O\_PUSCH}(j) + \alpha(j) \cdot PL + f(i)\} \quad \text{<Equation 20>}$$

In Equation 20, i indicates a subframe index, $P_{CMAX}$ indicates the transmission power of predetermined UE, $P_{SRS\_OFFSET}$ indicates a UE-specific parameter of 4 bits in length that is determined by a high layer, $M_{SRS}$ indicates the bandwidth of SRS transmission which is represented by the number of resource blocks in a subframe having an index of i, and f(i) indicates a current power control adjustment state for a PUSCH.

When UE may select transmit antennas, the index $a(n_{SRS})$ of an UE antenna on which an SRS is transmitted at a time $n_{SRS}$ may be given by $a(n_{SRS}) = n_{SRS} \mod 2$ when frequency hopping is not possible and may be given by Equation 21 when frequency hopping is possible.

$$a(n_{SRS}) = \begin{cases} (n_{SRS} + \lfloor n_{SRS}/2 \rfloor + \beta \cdot \lfloor n_{SRS}/K \rfloor) \mod 2 & \text{when } K \text{ is even} \\ n_{SRS} \mod 2 & \text{when } K \text{ is odd} \end{cases} \quad \text{<Equation 21>}$$

In Equation 21, $$K = \prod_{b'=b_{hop}}^{B_{SRS}} N_b$$

If a simultaneous-AN-and-SRS parameter is false, UE does not always send an SRS when SRS transmission and the transmission of a PUCCH on which ACK/NACK is carried are performed in the same subframe. Furthermore, if a simultaneous-AN-and-SRS parameter is true, UE always sends an SRS when SRS transmission and the transmission of a PUCCH on which ACK/NACK is carried are performed in the same subframe. The simultaneous-AN-and-SRS, that is, a parameter given by a high layer determines whether UE supports the simultaneous transmission of a PUCCH on which ACK/NACK is carried and an SRS in one subframe. If UE configures a PUCCH on which ACK/NACK are carried and an SRS in order to simultaneously send the PUCCH and the SRS, ACK/NACK may be transmitted in a cell-specific SRS subframe. In this case, a shortened PUCCH format may be used, and the transmission of ACK/NACK corresponding to a position at which the SRS is transmitted is punctured.

Tables 12 and 13 are examples of UE-specific SRS configurations, each indicating $T_{SRS}$, that is, an SRS transmission periodicity and $T_{offset}$, that is, an SRS subframe offset. The SRS transmission periodicity $T_{SRS}$ may be determined as any one of {2, 5, 10, 20, 40, 80, 160, 320} ms.

Table 12 is an example of SRS configurations in an FDD system.

TABLE 12

| SRS Configuration Index $I_{SRS}$ | SRS Periodicity $T_{SRS}$ (ms) | SRS Subframe Offset $T_{offset}$ |
|---|---|---|
| 0-1 | 2 | $I_{SRS}$ |
| 2-6 | 5 | $I_{SRS}$-2 |
| 7-16 | 10 | $I_{SRS}$-7 |
| 17-36 | 20 | $I_{SRS}$-17 |
| 37-76 | 40 | $I_{SRS}$-37 |
| 77-156 | 80 | $I_{SRS}$-77 |
| 157-316 | 160 | $I_{SRS}$-157 |
| 317-636 | 320 | $I_{SRS}$-317 |
| 637-1023 | reserved | reserved |

Table 13 is an example of SRS configurations in a TDD system.

TABLE 13

| Configuration Index $I_{SRS}$ | SRS Periodicity $T_{SRS}$ (ms) | SRS Subframe Offset $T_{offset}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS}$-10 |
| 15-24 | 10 | $I_{SRS}$-15 |
| 25-44 | 20 | $I_{SRS}$-25 |
| 45-84 | 40 | $I_{SRS}$-45 |
| 85-164 | 80 | $I_{SRS}$-85 |
| 165-324 | 160 | $I_{SRS}$-165 |
| 325-644 | 320 | $I_{SRS}$-325 |
| 645-1023 | reserved | reserved |

$T_{SRS}$>2 in a TDD system and an SRS subframe in an FDD system satisfy $(10*n_f + k_{SRS} - T_{offset}) \mod T_{SRS} = 0$. $n_f$ of indicates a frame index, and $k_{SRS}$ may be determined by a subframe index within a frame in an FDD system and may be determined by Table 14 in a TDD system. If $T_{SRS}$=2 in a TDD system, an SRS subframe satisfies $(k_{SRS} - T_{offset}) \mod 5 = 0$.

TABLE 14

| | Subframe Index n | | | | | | | | | |
|---|---|---|---|---|---|---|---|---|---|---|
| | 1 | | | | | 6 | | | | |
| | 0 | 1st Symbol Of UpPTS | 2nd symbol of UpPTS | 2 | 3 | 4 | 5 | 1st Symbol of UpPTS | 2nd symbol of UpPTS | 7 | 8 | 9 |
| $k_{SRS}$ in case UpPTS length of 2 symbols | 0 | 1 | | 2 | 3 | 4 | | 5 | 6 | 7 | 8 | 9 |
| $k_{SRS}$ in case UpPTS length of 1 symbol | | 1 | | 2 | 3 | 4 | | 6 | | 7 | 8 | 9 |

Meanwhile, an orthogonal code cover (OCC) can be applied to a reference signal sequence. The OCC implies a code having orthogonality and applicable to a sequence. In general, a reference signal sequence having a different cyclic shift value can be used to multiplex a reference signal between layers or users. However, the OCC can be applied to increase a multiplexing level and to decrease interference between the layers or the users.

Figure 14:
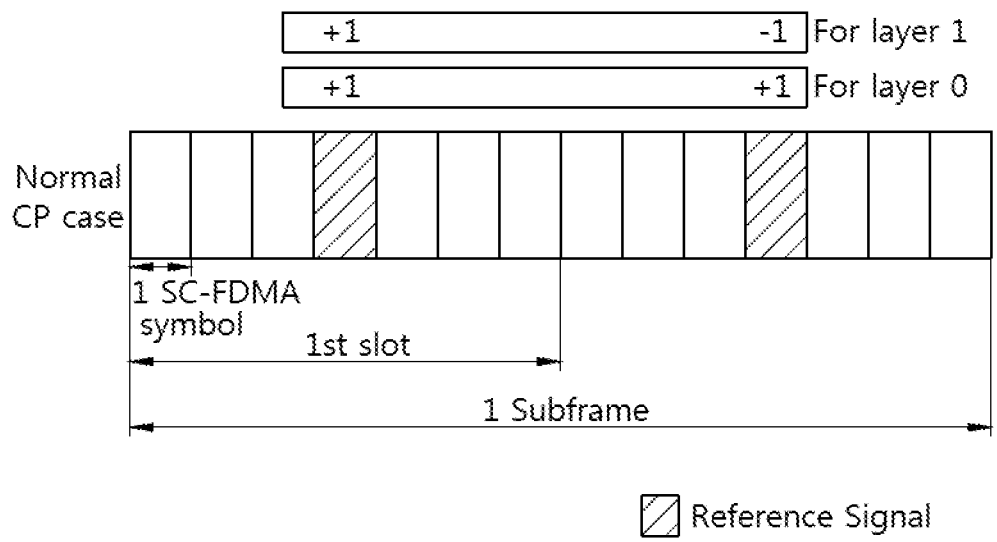
FIG. 14 shows an example in which an OCC is applied to a reference signal.

FIG. 14 shows an example in which an OCC is applied to a reference signal.

In one subframe, both of a reference signal sequence for a layer 0 and a reference signal sequence for a layer 1 are mapped to a $4^{th}$ OFDM symbol of a $1^{st}$ slot and a $4^{th}$ OFDM symbol of a $2^{nd}$ slot. In each layer, the same sequence is mapped to two OFDM symbols. In this case, the reference signal sequence for the layer 0 is multiplied by an orthogonal sequence [+1+1] and is then mapped to an OFDM symbol. The reference signal sequence for the layer 1 is multiplied by an orthogonal sequence [+1−1] and is then mapped to an OFDM symbol. That is, when the reference signal sequence for the layer 1 is mapped to a $2^{nd}$ slot in one subframe, it is mapped by multiplying −1.

When the OCC is applied as described above, a BS which receives a reference signal can estimate a channel of the layer 0 by adding a reference signal sequence transmitted in the $1^{st}$ slot and a reference signal sequence transmitted in the $2^{nd}$ slot. In addition, the BS can estimate a channel of the layer 1 by subtracting the reference signal sequence transmitted in the $2^{nd}$ slot from the reference signal sequence transmitted in the $1^{st}$ slot. That is, by applying the OCC, the BS can identify a reference signal transmitted in each layer. Therefore, a plurality of reference signals can be transmitted by using the same resource. If the number of available cyclic shift values is 6, the number of users or the number of layers that can be multiplexed by using the OCC can be increased to up to 12.

Although it is assumed in this example that a binary format of [+1+1] or [+1−1] is used as the OCC, the present invention is not limited thereto, and thus various types of orthogonal sequences can be used as the OCC.

In addition, by applying the OCC, a reference signal can be multiplexed in an easier manner between users having different bandwidths.

Figure 15:
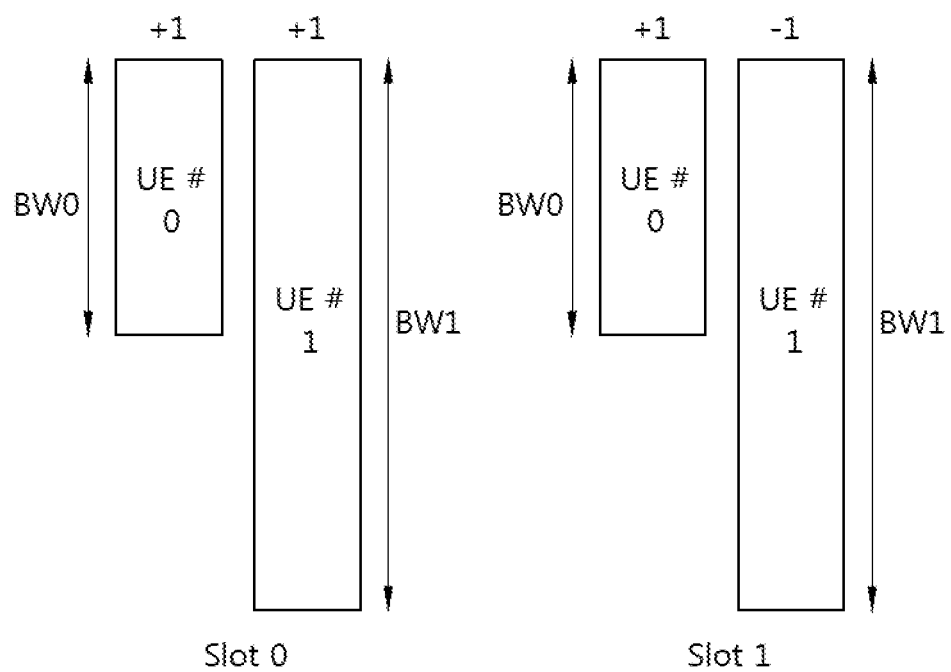
FIG. 15 shows an example of multiplexing a reference signal transmitted from two UEs having different bandwidths by applying an OCC.

FIG. 15 shows an example of multiplexing a reference signal transmitted from two UEs having different bandwidths by applying an OCC.

Each of a $1^{st}$ UE and a $2^{nd}$ UE transmits a reference signal by using a different bandwidth. The $1^{st}$ UE (or UE #0) transmits a reference signal through a $1^{st}$ bandwidth (or BW0), and the $2^{nd}$ UE (or UE #1) transmits a reference signal through a $2^{nd}$ bandwidth (or BW1). The reference signal transmitted by the $1^{st}$ UE is multiplied by an orthogonal sequence [+1+1] in each of a $1^{st}$ slot and a $2^{nd}$ slot. The reference signal transmitted by the $2^{nd}$ UE is multiplied by an orthogonal sequence [+1−1] in each of the $1^{st}$ slot and the $2^{nd}$ slot. Accordingly, a BS which receives the reference signal from the $1^{st}$ UE and the $2^{nd}$ UE can perform channel estimation by identifying each of the two UEs.

Hereinafter, multiple-input multiple-output (MIMO) will be described. A MIMO method can be divided into two methods, i.e., per-antenna rate control (PARC) and per-user unitary rate control (RU2RC).

Figure 16:
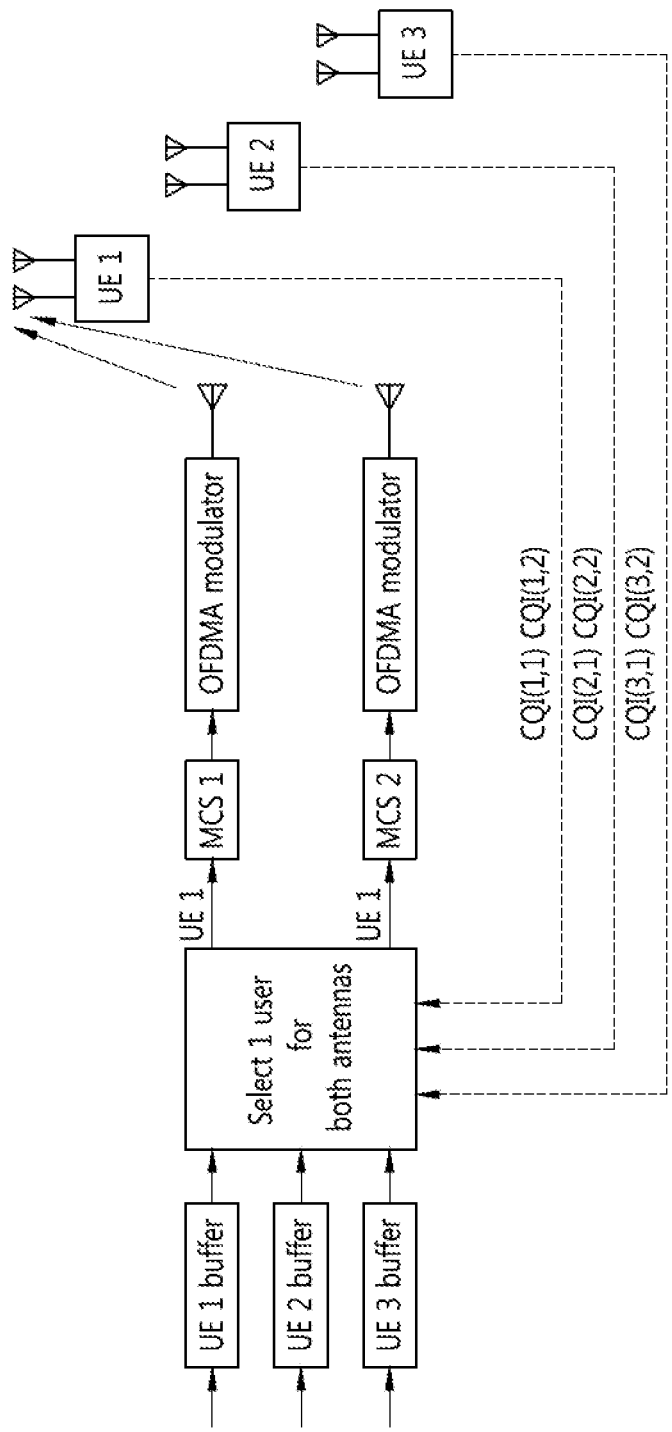
FIG. 16 shows an example of a PARC method.

FIG. 16 shows an example of a PARC method.

PARC is a method for performing MIMO by using spatial multiplexing. According to the PARC method, spatial resources can be allocated to one UE or a plurality of UEs. When the spatial resources are allocated to one UE, it is called single-user (SU) MIMO. When the spatial resources are allocated to a plurality of UEs, it is called multi-user (MU) MIMO.

The example of FIG. 15 is a case where a PARC method is applied to SU-MIMO. When assuming 3 UEs, a BS selects one UE to which a plurality of antennas transmit data among the three 3 UEs. When a $1^{st}$ UE is selected, a modulation and coding scheme (MCS) level for each of the plurality of antennas is determined, and data is transmitted to the $1^{st}$ UE through the plurality of antennas by using an OFDMA modulator. The UEs respectively transmit channel quality indicators (CQIs) for the plurality of antennas of the corresponding UE to the BS.

Figure 17:
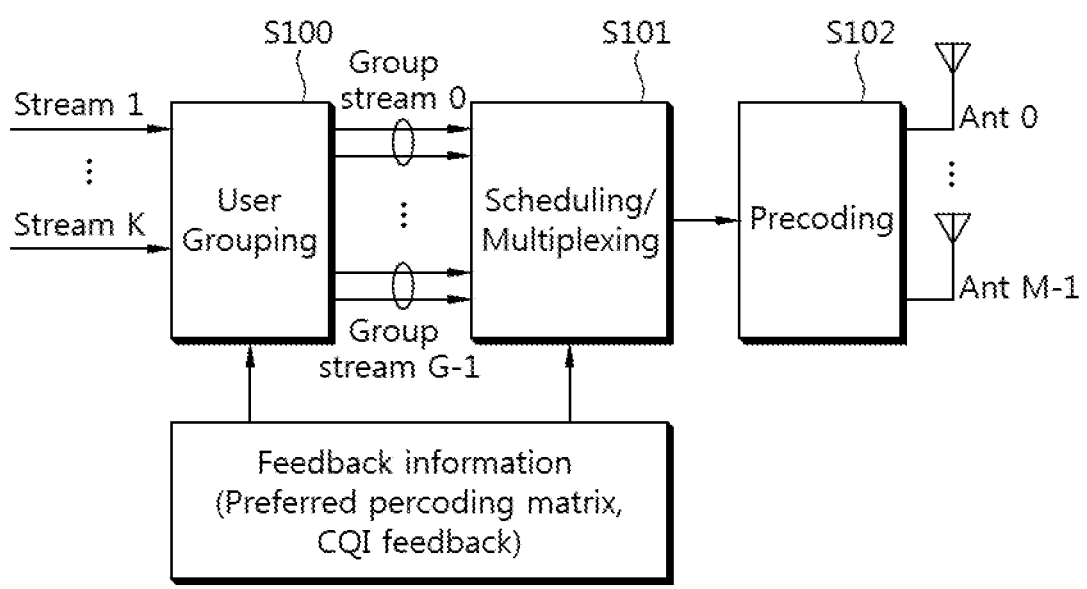
FIG. 17 shows an example of a PU2RC method.

FIG. 17 shows an example of a PU2RC method.

In PU2RC, multi-user interference is decreased by precoding data on the basis of a codebook. A BS performs grouping on a plurality of UEs to generate a plurality of group streams (step S100). The BS performs scheduling and multiplexing on the generated group stream (step S101). The BS performs precoding on each group stream by using a precoding matrix corresponding to each group (step S102), and transmits it through a plurality of antennas. When performing precoding, unitary codebook-based precoding can be used. Each UE feeds back a preferred precoding matrix, a transmit antenna, and a CQI corresponding to each transmit antenna to the BS. The BS can use feedback information when performing scheduling. As such, since the multi-user interference can be decreased by performing MIMO by the use of the precoding, a high performance gain can be obtained in a MU-MIMO environment.

A wireless communication system can support a UL or DL HARQ.

Figure 18:
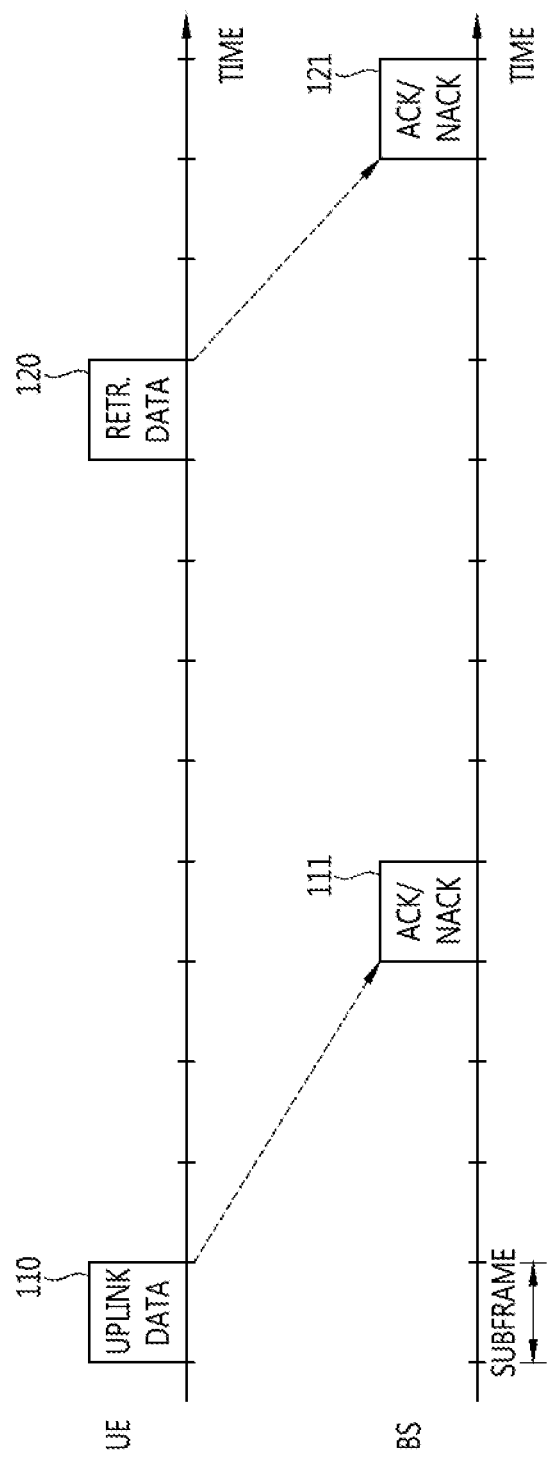
FIG. 18 shows a UL HARQ.

FIG. 18 shows a UL HARQ.

A BS receives UL data 110 from a UE through a PUSCH, and after a specific subframe elapses, transmits an ACK/NACK signal 111 through a PHICH. The ACK/NACK signal 111 corresponds to an ACK signal when the UL data 110 is successfully decoded, and corresponds to a NACK signal when the UL data 110 fails in decoding. Upon receiving the NACK signal, the UE can transmit retransmission data 120 for the UL data 110 until ACK information is received or until retransmission is performed up to a maximum number of retransmission attempts.

The BS can transmit an ACK/NACK signal 121 for the retransmission data 120 through the PHICH.

The following description is about the PHICH.

Figure 19:
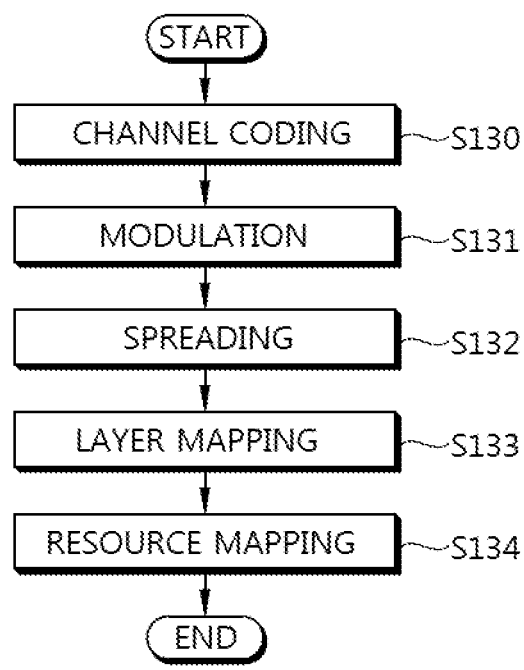
FIG. 19 is a flowchart showing transmission of an ACK/NACK signal through a PHICH.

FIG. 19 is a flowchart showing transmission of an ACK/NACK signal through a PHICH.

Since an LTE system does not support SU-MIMO in an uplink, one PHICH carries only 1-bit ACK/NACK corresponding to a PUSCH for one UE, that is, corresponding to a single stream. In step S130, the 1-bit ACK/NACK is coded into 3 bits by using a repetition code having a code rate of ⅓. In step S131, the coded ACK/NACK is modulated using binary phase shift keying (BPSK) to generate 3 modulation symbols. In step S132, the modulation symbols are spread by using a spreading factor (SF) of 4 in a normal CP structure and by using an SF of 2 in an extended CP structure. An orthogonal sequence is used when spreading the modulation symbols, and the number of orthogonal sequences used in the spreading is SF×2 to apply UQ multiplexing. PHICHs which are spread by using SF×2 orthogonal sequences can be defined as one PHICH group. In step S133, layer mapping is performed on the spread symbols. In step S124, the layer-mapped symbols are transmitted by being mapped to resources.

The PHICH carries HARQ ACK/NACK depending on PUSCH transmission. A plurality of PHICHs mapped to resource elements of the same set constitutes a PHICH group. Each PHICH in the PHICH group is identified by a different orthogonal sequence. In the FDD system, $N_{PHICH}^{group}$, i.e., the number of PHICH groups, is constant in all subframes, and can be determined by Equation 22 below.

$$N_{PHICH}^{group} = \begin{cases} \lceil N_g(N_{RB}^{DL}/8) \rceil & \text{for normal cyclic prefix} \\ 2 \cdot \lceil N_g(N_{RB}^{DL}/8) \rceil & \text{for extended cyclic prefix} \end{cases}$$

<Equation 22>

In Equation 22, $N_g$ is transmitted in a higher layer through a physical broadcast channel (PBCH), where $N_g \in \{⅙, ½, 1, 2\}$. The PBCH carries essential system information when a UE communicates with a BS. The system information transmitted through the PBCH is called a master information block (MIB). In comparison, system information transmitted through a physical downlink control channel (PDCCH) is called a system information block (SIB). $N_{RB}^{DL}$ denotes a DL bandwidth configuration expressed with a multiple of $N_{sc}^{RB}$ which is an RB size in a frequency domain. A PHICH group index $n_{PHICH}^{group}$ is any one integer from 0 to $N_{PHICH}^{group} - 1$.

A resource used in the PHICH can be determined based on a lowest physical resource block (PRB) index in resource allocation of the PUSCH and a cyclic shift (CS) value of a demodulation reference signal (DMRS) transmitted using a UL grant. A resource to which the PHICH is mapped (hereinafter, a PHICH resource) can be expressed by an index pair $(n_{PHICH}^{group}, n_{PHICH}^{seq})$. Herein, $n_{PHICH}^{group}$ denotes a PHICH group index, and $n_{PHICH}^{seq}$ denotes an orthogonal sequence index in the PHICH group. The index pair $(n_{PHICH}^{group}, n_{PHICH}^{seq})$ can be determined by Equation 23 below.

$$n_{PHICH}^{group} = (I_{PRB\_RA}^{lowest\_index} + n_{DMRS}) \mod N_{PHICH}^{group} + I_{PHICH} N_{PHICH}^{group}$$

$$n_{PHICH}^{seq} = (\lfloor I_{PRB\_RA}^{lowest\_index} / N_{PHICH}^{group} \rfloor + n_{DMRS}) \mod 2N_{SF}^{PHICH}$$

<Equation 23>

$n_{DMRS}$ can be determined based on a "cyclic shift for DMRS" field in a DCI format 0 according to Table 15.

TABLE 15

| Cyclic Shift for DMRS Field in DCI format 0 | $n_{DMRS}$ |
|---|---|
| 000 | 0 |
| 001 | 1 |
| 010 | 2 |
| 011 | 3 |
| 100 | 4 |
| 101 | 5 |
| 110 | 6 |
| 111 | 7 |

In addition, in a case where a PDCCH including the DCI format 0 is not transmitted in the same transport block, $n_{DMRS}$ may be 0 if a first PUSCH is semi-persistently scheduled in the same transport block or if the first PUSCH is scheduled in the same transport block by a random access response grant.

Returning to Equation 23, $N_{SF}^{PHICH}$ denotes a spreading factor (SF) used in PHICH modulation. $I_{PRB\_RA}^{lowest\_index}$ is a lowest PRB index among PRBs of a slot in which a PUSCH corresponding to a PHICH is transmitted. $I_{PHICH}$ has a value of 0 or 1.

An orthogonal sequence used in the PHICH can be determined by Table 16. The orthogonal sequence in use may vary depending on a value $n_{PHICH}^{seq}$ or a CP structure.

TABLE 16

| Sequence Index ($n_{PHICH}^{seq}$) | Orthogonal Sequence | |
|---|---|---|
| | Normal CP($N_{SF}^{PHICH}$ = 4) | Extended CP($N_{SF}^{PHICH}$ = 2) |
| 0 | [+1 +1 +1 +1] | [+1 +1] |
| 1 | [+1 −1 +1 −1] | [+1 −1] |
| 2 | [+1 +1 −1 −1] | [+j +j] |
| 3 | [+1 −1 −1 +1] | [+j −j] |
| 4 | [+j +j +j +j] | — |
| 5 | [+j −j +j −j] | — |
| 6 | [+j +j −j −j] | — |
| 7 | [+j −j −j +j] | — |

The plurality of PHICHs can be simultaneously allocated. In particular, the plurality of PHICHs can be allocated in a system such as a carrier aggregation system, MU-MIMO, a cooperative multi-point (CoMP) transmission scheme, etc.

Figure 20:
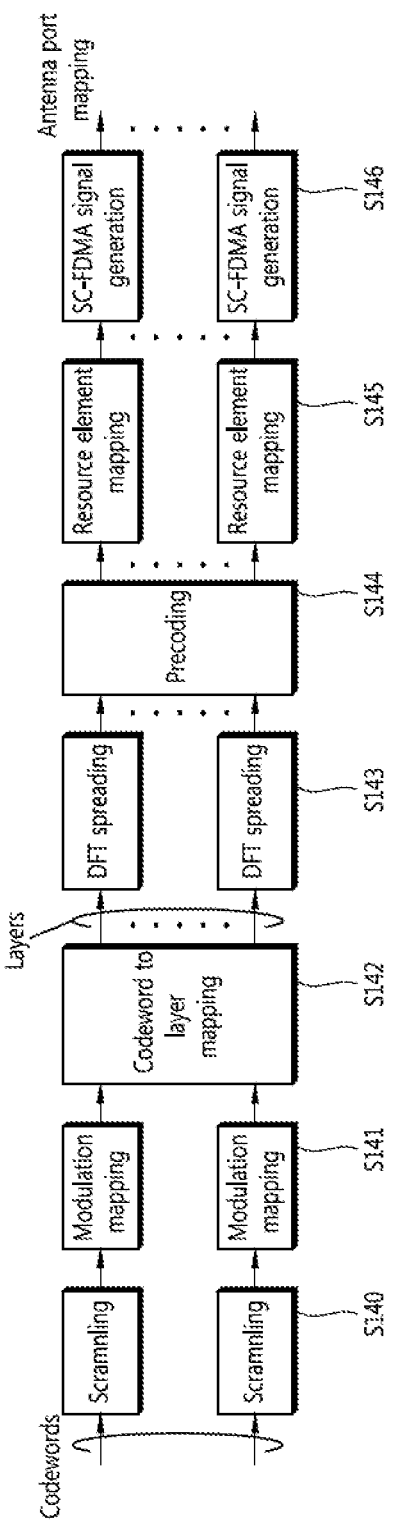
FIG. 20 is a block diagram showing a MIMO transmission process in an uplink to which an SC-FDMA transmission method is applied.

FIG. 20 is a block diagram showing a MIMO transmission process in an uplink to which an SC-FDMA transmission method is applied.

In order to perform MIMO transmission, a plurality of codewords can be used. If it is assumed that the number of codewords is 2, each codeword is scrambled in step S140, the codeword is mapped to a modulation symbol in step S141, and the symbols are mapped to respective layers in step S142. Each of the layers is DFT-spread in step S143, and is precoded in step S144. A stream generated by being precoded is mapped in step S145, and is transmitted through each antenna by using an SC-FDMA signal generator in step S146. To facilitate HARQ for an uplink, two independent ACK/NACK signals are required for the respective codewords.

Figure 21:
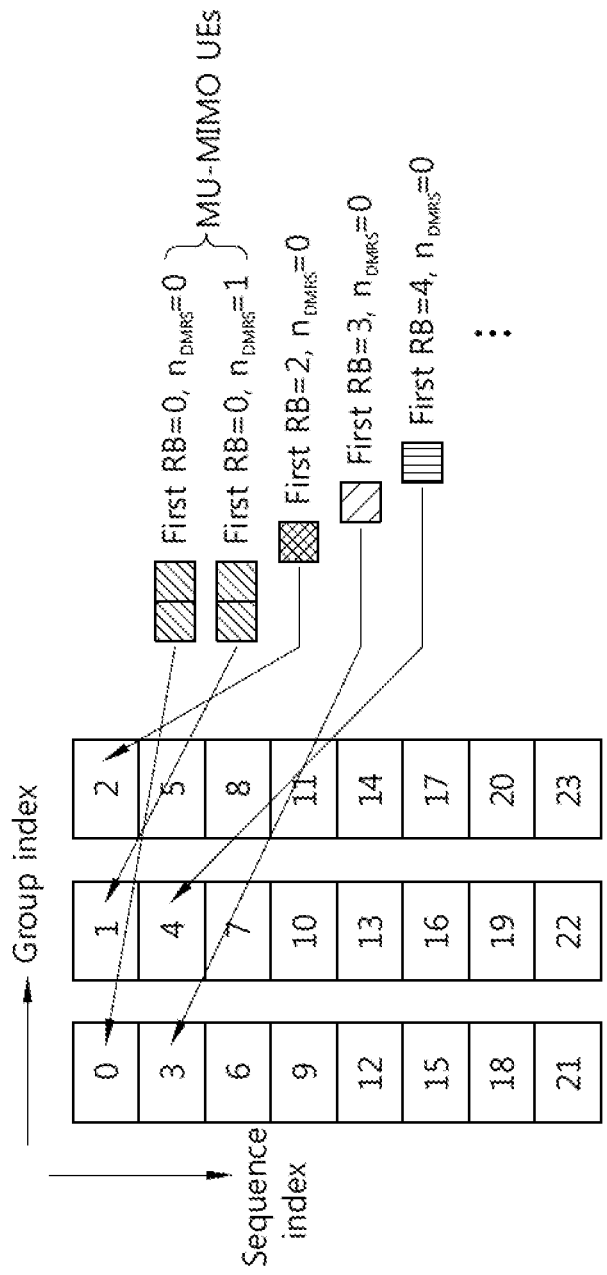
FIG. 21 is an example of PHICH resource allocation.

FIG. 21 is an example of PHICH resource allocation.

In FIG. 21, a horizontal axis indicates a PHICH group index, and a vertical axis indicates an orthogonal sequence index within a PHICH group. In each UE, relevant PHICH resources are determined by the smallest PRB index to which a PUSCH is allocated and an $n_{DMRS}$ value. For example, PHICH resources may be determined by Equation 23. PHICH resources for a maximum of 8 users may be distinguished from one another in an MU-MIMO environment by using $n_{DMRS}$. Accordingly, when a plurality of PHICHs is transmitted, PHICH resources can be prevented from colliding with one another.

PHICH resources corresponding to 2 PUSCHs transmitted through 2 antenna from a first UE are allocated to a resource element #0 having an index (0,0) and a resource element #1 having an index (1,0), respectively. In this case, the smallest PRB indices on which the respective PUSCHs are transmitted may be the same, and $n_{DMRS}$ may differ. Furthermore, a PHICH resource corresponding to a PUSCH transmitted from a second UE is allocated to a resource element #2 having an index (2,0). Likewise, PHICH resources corresponding to respective PUSCHs transmitted from a third UE and a fourth UE, respectively, are allocated to a resource element #3 having an index (0,1) and a resource element #4 having an index (1,1).

If data is multiplexed by using an OCC, the smallest PRB index and $n_{DMRS}$ may be the same. If different OCCs are used, a plurality of data or a plurality of reference signals may be transmitted using the same resource. Here, a plurality of relevant PHICHs uses the same resource according to Equation 23, but PHICH resources collide with each other. Accordingly, there is a need for a method of preventing a collision between PHICH resources when the plurality of PHICHs is allocated.

A method for solving the collision problem of the PHICH resources is described below.

Figure 22:
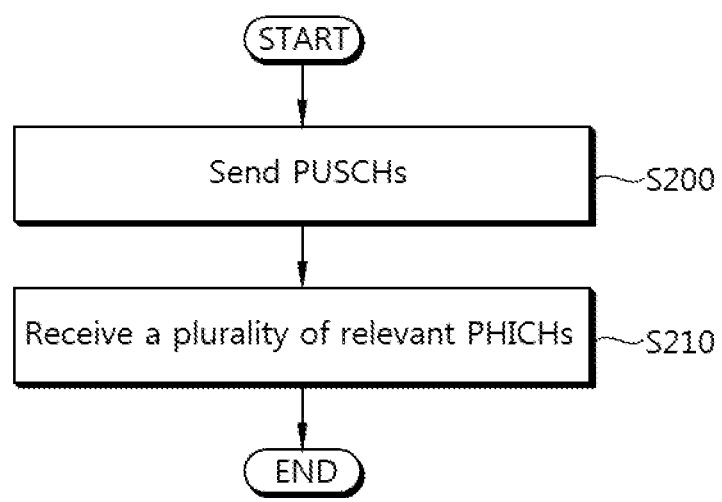
FIG. 22 shows an embodiment of a proposed method of performing an HARQ.

FIG. 22 shows an embodiment of a proposed method of performing an HARQ.

At step S200, UE sends uplink data to a BS on a PUSCH through a plurality of antennas. At step S210, the UE receives an ACK/NACK signal, indicating whether the uplink data has been received, on a PHICH corresponding to the PUSCH through the plurality of antennas from the BS. At this time, the PHICH resources on which the respective PHICH are transmitted do not overlap with one another.

In order for the PHICH resources on which the respective PHICHs are transmitted not to overlap with each other, a variety of methods may be proposed.

1) When an OCC is applied, the PHICH resources may be determined, including a parameter regarding the OCC. Equation 24 is an example of an equation that determines the PHICH resources.

$$n_{PHICH}^{group} = (I_{PRB\_RA}^{lowest\_index} + n_{DMRS} + n_{OCC}) \bmod N_{PHICH}^{group} + I_{PHICH} N_{PHICH}^{group}$$

$$n_{PHICH}^{seq} = (\lfloor I_{PRB\_RA}^{lowest\_index}/N_{PHICH}^{group} \rfloor + n_{DMRS} + n_{OCC}) \bmod 2N_{SF}^{PHICH}$$ <Equation 24>

In Equation 24, $n_{OCC}$ is an example of the parameter regarding the OCC as an OCC index. The OCC index may be any one of 0 and 1, assuming that 2 DMRSs are transmitted within one subframe. Since a PHICH resource index is determined based on $n_{OCC}$, the plurality of PHICH resources can be prevented from colliding with one another.

In Equation 24, new $n_{DMRS(2)}$ in which $n_{DMRS}$ and $n_{OCC}$ are combined may be defined. That is, Equation 24 may be represented like Equation 25.

$$n_{PHICH}^{group} = (I_{PRB\_RA}^{lowest\_index} + n_{DMRS(2)}) \bmod N_{PHICH}^{group} + I_{PHICH} N_{PHICH}^{group}$$

$$n_{PHICH}^{seq} = (\lfloor I_{PRB\_RA}^{lowest\_index}/N_{PHICH}^{group} \rfloor + n_{DMRS(2)}) \bmod 2N_{SF}^{PHICH}$$ <Equation 25>

$n_{DMRS(2)}$ may be a value defined by simply adding $n_{DMRS}$ and $n_{OCC}$ as in Equation 24 or may be a newly defined value in which $n_{DMRS}$ and $n_{OCC}$ are combined.

Alternatively, the PHICH resources may be determined based on the parameter regarding an OCC while using Equation 23 without change. In this case, in Equation 23, $n_{DMRS}$ that determines the PHICH resources may include the OCC parameter. That is, $n_{DMRS}$ is determined by the DMRS cyclic shift field of a DCI format 0 according to Table 15. The DMRS cyclic shift field may indicate even a UE-specific OCC value $n_{DMRS}^{OCC}$ in addition to $n_{DMRS}^{(2)}$ of Table 4 or 5.

Table 17 shows a mapping relationship between the DMRS cyclic shift field, $n_{DMRS}^{(2)}$, and $n_{DMRS}^{OCC}$.

TABLE 17

| Cyclic Shift Field in DCI format 0 | $n_{DMRS}^{(2)}$ | $n_{DMRS}^{OCC}$ |
|---|---|---|
| 000 | 0 | [+1 +1] |
| 001 | 6 | [+1 +1] |
| 010 | 3 | [+1 −1] |
| 011 | 4 | [+1 −1] |
| 100 | 2 | [+1 +1] |
| 101 | 8 | [+1 +1] |
| 110 | 10 | [+1 −1] |
| 111 | 9 | [+1 −1] |

Referring to Table 17, the DMRS cyclic shift field indicates $n_{DMRS}^{OCC}$, that is, a UE-specific OCC value in addition to $n_{DMRS}^{(2)}$ indicating a cyclic shift value. In $n_{DMRS}^{OCC}$, [+1 +1] and [+1 −1] mean values applied to 2 slots within a subframe, respectively. That is, the first value of a sequence is a value applied to the first slot, and the second value thereof is a value applied to the second slot. $n_{DMRS}^{OCC}$ may be likewise applied to a plurality of layers. A new DMRS cyclic shift field may be configured by a combination of $n_{DMRS}^{(2)}$ and $n_{DMRS}^{OCC}$, and the newly configured DMRS cyclic shift field includes a parameter regarding an OCC although it has the same value. Accordingly, PHICH resources based on the newly configured DMRS cyclic shift field may do not collide with one another.

Table 18 shows another mapping relationship between a DMRS cyclic shift field, $n_{DMRS}^{(2)}$, and $n_{DMRS}^{OCC}$.

TABLE 18

| Cyclic Shift Field in DCI format 0 | $n_{DMRS}^{(2)}$ | $n_{DMRS}^{OCC}$ |
|---|---|---|
| 000 | 0 | [+1 +1] |
| 001 | 6 | [+1 +1] |
| 010 | 3 | [+1 −1] |
| 011 | 0 | [+1 −1] |
| 100 | 2 | [+1 +1] |
| 101 | 8 | [+1 +1] |
| 110 | 10 | [+1 −1] |
| 111 | 9 | [+1 −1] |

Tables 19 to 21 show examples of an $n_{DMRS}^{(2)}$ offset and an $n_{DMRS}^{OCC}$ offset applied to each layer. $(n_{DMRS}^{(2)})'$ or $(n_{DMRS}^{OCC})'$ of Tables 19 to 21 may be applied to $n_{DMRS}^{(2)}$ or $n_{DMRS}^{OCC}$ of Table 17 or 18, respectively. For example, if $(n_{DMRS}^{(2)})'=6$ and $n_{DMRS}^{(2)}=3$, the final cyclic shift value may be (6+3) mod 12=9. Furthermore, if $(n_{DMRS}^{OCC})'=[+1+1]$ and $n_{DMRS}^{OCC}=[+1-1]$, the final UE-specific OCC value may be $[+1+1]*[+1-1]$.

Table 19 shows a case where the number of layers is 4.

TABLE 19

|  | 1st Layer | 2nd Layer | 3rd Layer | 4th Layer |
|---|---|---|---|---|
| $(n_{DMRS}^{(2)})'$ | 0 | 6 | 3 | 9 |
| $(n_{DMRS}^{OCC})'$ | [+1 +1] | [+1 +1] | [+1 −1] | [+1 −1] |

Table 20 shows a case where the number of layers is 3.

TABLE 20

|  | 1st Layer | 2nd Layer | 3rd Layer |
|---|---|---|---|
| $(n_{DMRS}^{(2)})'$ | 0 | 6 | 3 |
| $(n_{DMRS}^{OCC})'$ | [+1 +1] | [+1 +1] | [+1 −1] |

Table 21 shows a case where the number of layers is 2.

TABLE 21

|  | 1st Layer | 2nd Layer |
|---|---|---|
| $(n_{DMRS}^{(2)})'$ | 0 | 6 |
| $(n_{DMRS}^{OCC})'$ | [+1 +1] | [+1 +1] |

Equation 26 is another example of an equation that determines PHICH resources.

$$n_{PHICH}^{group}=((I_{PRB\_RA}^{lowest\_index}+n_{OCC})+n_{DMRS}) \bmod N_{PHICH}^{group}+I_{PHICH}N_{PHICH}^{group}$$

$$n_{PHICH}^{seq}=(\lfloor (I_{PRB\_RA}^{lowest\_index}+n_{OCC})/N_{PHICH}^{group} \rfloor+n_{DMRS}) \bmod 2N_{SF}^{PHICH}$$ <Equation 26>

In Equation 26, like in Equation 24, PHICH resources may be determined based on $n_{OCC}$, that is, a parameter regarding an OCC.

Table 22 shows an example of an OCC index $n_{OCC}$. The OCC index may be signalized or previously determined. If the OCC index is signalized, the OCC index may be dynamically signalized through a PDCCH, etc. or may be semi-statically signalized through an RRC message, etc. Table 22 shows a case where the OCC index is signalized through a PDCCH.

TABLE 22

| OCC for DMRS Field in DCI format | $n_{OCC}$ |
|---|---|
| 0 | 0 |
| 1 | 1 |

At this time, the PHICH resources may be multiplexed according to a Time Division Multiplexing (TDM) method. In general, when a PUSCH is transmitted in a subframe n, a PHICH corresponding to the PUSCH is transmitted in a subframe (n+4). If the PHICH resources are multiplexed according to the TDM method, the PHICH may be transmitted in a subframe n+α. The α is a given integer that may be defined by being combined with an OCC index. For example, α=0 may be defined for first UE having $n_{OBB}=0$, and α=4 may be defined for second UE having $n_{OCC}=1$. That is, a PHICH for the first UE having α=0 may be transmitted in a subframe n+4, and a PHICH for the second UE having α=4 may be transmitted in a subframe n+8. A collision between PHICH resources can be prevented by transmitting a plurality of PHICHs using different subframes. Retransmission timing for the PHICH may be delayed depending on α. In this example, α=4 is assumed, but not limited thereto. a may be a specific integer.

2) The DCI format 0 of LTE Rel-8 may be used without change.

The DCI format 0 is used to schedule a PUSCH, and it may include the following pieces of information. For the pieces of information, reference may be made to Paragraph 5.3.3.1 of 3GPP TS 36.212 V8.7.0 (2009 May) "3rd Generation Partnership Project; Technical Specification Group Radio Access Network; Evolved Universal Terrestrial Radio Access (E-UTRA); Multiplexing and channel coding (Release 8)".

A flag to distinguish a DCI format 0 and a DCI format 1A from each other: 1 bit

A hopping flag: 1 bit

Resource block allocation and hopping resource allocation:

$\lceil \log_2(N_{RB}^{UL}(N_{RB}^{UL}+1)/2) \rceil_{bit}$

A modulation and coding scheme (MCS) and redundancy version (RV): 5 bits

A new data indicator (NDI): 1 bit

A transmit power command (TPC) command for a scheduled PUSCH: 2 bits

A cyclic shift for a DMRS: 3 bits

An uplink index: 2 bits

A downlink assignment index (DAI): 2 bits

A CQI request: bit

The remaining bits are subject to zero-padded until the size of a payload becomes equal to the size of a DCI format 1A.

In any one of the various kinds of pieces of information listed above, 1 bit may be used to indicate an OCC index. For example, $n_{OCC}$ in Equation 24 or Table 17 may be indicated using the hopping flag having the length of 1 bit. An OCC is commonly applied when not being hopped, and the hopping flag may be used to indicate an OCC index assuming that hopping is not applied.

3) A plurality of PHICH resources is determined by Equation 23, but a collision between the PHICH resources can be prevented by always applying different $n_{DMRS}$ to different users.

4) PHICHs for respective UEs are bundled by using the same PHICH resources and transmitted. This may be called PHICH bundling. A representative PHICH that represents a plurality of PHICHs may be transmitted by PHICH bundling. For example, if all of a plurality of PHICHs for a plurality of UEs send ACK, the ACK may be transmitted through a representative PHICH. Furthermore, if at least one of a plurality of PHICHs for a plurality of UEs sends NACK, the NACK may be transmitted through a representative PHICH.

Figure 23:
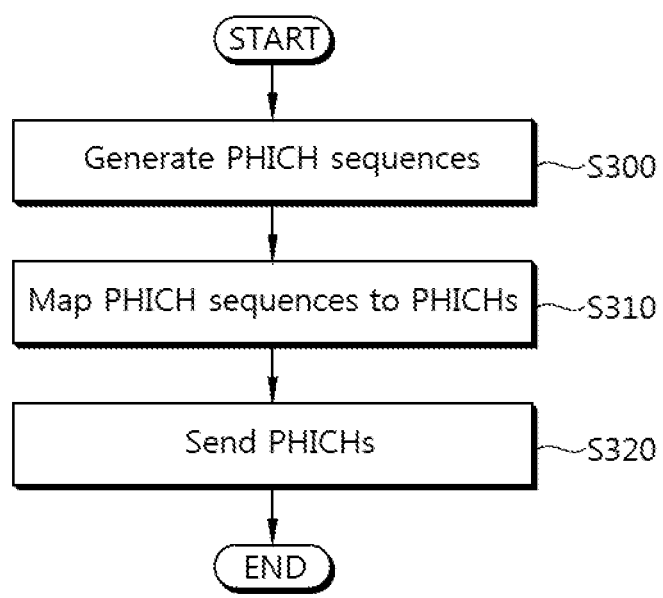
FIG. 23 shows an embodiment of a proposed method of transmitting an ACK/NACK signal.

FIG. 23 shows an embodiment of a proposed method of transmitting an ACK/NACK signal.

At step S300, a BS generates a plurality of PHICH sequences. At step S310, the BS maps the plurality of generated PHICH sequences to downlink resources. At this time, the resources to which the plurality of PHICHs is mapped do not overlap with one another. At step S320, the BS sends the plurality of mapped PHICH sequences to a plurality of UEs.

Figure 24:
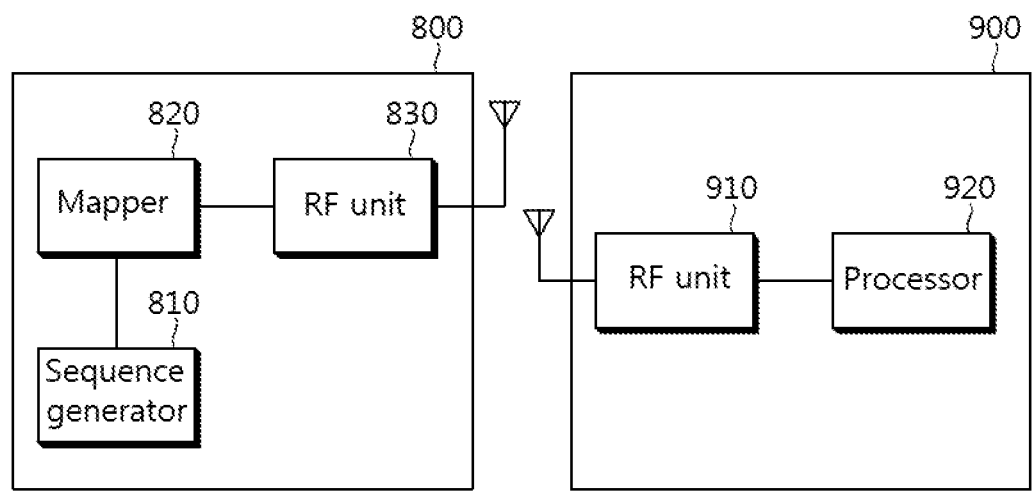
FIG. 24 is a block diagram showing a BS and UE to which the embodiments of the present invention are implemented.

FIG. 24 is a block diagram showing a BS and UE to which the embodiments of the present invention are implemented.

The BS 800 includes a sequence generator 810, a mapper 820, and a Radio Frequency (RF) Unit 830. The sequence generator 810 generates a plurality of PHICH sequences. The mapper 820 maps the plurality of generated PHICH sequences to downlink resources. At this time, the resources to which the plurality of PHICHs is mapped may do not overlap with one another. The RF unit 830 is coupled to the mapper 820 and is configured to send the plurality of mapped PHICH sequences to a plurality of UEs.

The UE 900 includes a processor 910 and an RF unit 920. The RF unit 920 is coupled to the processor 910 and is configured to send uplink data through a plurality of antennas on PUSCHs and send an ACK/NACK signal through the plurality of antennas on PHICHs corresponding to the PUSCHs. The processor 910 processes the uplink data and an ACKJNACK signal indicating whether the uplink data has been received.

The exemplary embodiments of the present invention may be implemented by hardware, software, or a combination thereof. The hardware may be implemented by an application specific integrated circuit (ASIC), digital signal processing (DSP), a programmable logic device (PLD), a field programmable gate array (FPGA), a processor, a controller, a microprocessor, other electronic units, or a combination thereof, all of which are designed so as to perform the above-mentioned functions. The software may be implemented by a module performing the above-mentioned functions. The software may be stored in a memory unit and may be executed by a processor. The memory unit or a processor may adopt various units well-known to those skilled in the art.

In the above-mentioned exemplary embodiments, the methods are described based on the series of steps or the flow charts shown by a block, but the exemplary embodiments of the present invention are not limited to the order of the steps and any steps may be performed in order different from the above-mentioned steps or simultaneously. In addition, a person skilled in the art to which the present invention pertains may understand that steps shown in the flow chart are not exclusive and thus, may include other steps or one or more step of the flow chart may be deleted without affecting the scope of the present invention.

The above-mentioned embodiments include examples of various aspects. Although all possible combinations showing various aspects are not described, it may be appreciated by those skilled in the art that other combinations may be made. Therefore, the present invention should be construed as including all other substitutions, alterations and modifications belonging to the following claims.

What is claimed is:

1. A method of determining a physical hybrid-ARQ indicator channel (PHICH) resource in a multi-antenna system, the method comprising:

transmitting uplink data through a plurality of antennas on a physical uplink shared channel (PUSCH); and determining a PHICH resource respectively corresponding to the uplink data, wherein the PHICH resource is determined based on a lowest physical resource block (PRB) index $I_{PRB\_RA}^{lowest\_index}$ among PRBs in a first slot to which the PUSCH is mapped, a cyclic shift field $n_{DMRS}$ for an uplink demodulation reference signal (DMRS), and a parameter regarding an orthogonal code cover (OCC), wherein the PHICH resource is determined based on Equation:

$$n_{PHICH}^{group}=(I_{PRB\_RA}^{lowest\_index}+n_{DMRS}+n_{OCC}) \bmod N_{PHICH}^{group}+I_{PHICH}N_{PHICH}^{group}$$

$$n_{PHICH}^{seq}=(\lfloor I_{PRB\_RA}^{lowest\_index}/N_{PHICH}^{group}\rfloor+n_{DMRS}+n_{OCC})\bmod 2N_{SF}^{PHICH},$$

where $n_{PHICH}^{group}$ is an index of a PHICH group, $n_{PHICH}^{seq}$ is an orthogonal sequence index in the PHICH group, $n_{DMRS}$ is the cyclic shift field for the uplink DMRS, $N_{SF}^{PHICH}$ is a size of a spreading factor (SF), $I_{PRB\_RA}^{lowest\_index}$ is the lowest PRB index among PRBs in a first slot to which the PUSCH is mapped, $n_{OCC}$ is an OCC index which is the parameter regarding the OCC, $N_{PHICH}^{group}$ is the number of PHICH groups, and $I_{PHICH}$ is a value 0 or 1, and wherein the $n_{OCC}$ is either 0 or 1.

2. The method of claim 1, wherein the parameter regarding the OCC is obtained through a physical downlink control channel (PDCCH) or a radio resource control (RRC) message from a base station.

3. The method of claim 1, wherein the parameter regarding the OCC is determined based on the cyclic shift field $n_{DMRS}$ for the uplink DMRS.

4. The method of claim 1, further comprising receiving an acknowledgement/non-acknowledgement (ACK/NACK) signal through the PHICH resource.

5. An apparatus for determining a physical hybrid-ARQ indicator channel (PHICH) resource in a multi-antenna system, the apparatus comprising:

a radio frequency (RF) unit configured for transmitting or receiving a radio signal; and a processor;

wherein the processor is configured to:

transmit the uplink data through a plurality of antennas on a physical uplink shared channel (PUSCH); and determining a PHICH resource respectively corresponding to the uplink data, wherein the PHICH resource is determined based on a lowest physical resource lowest index block (PRB) index $I_{PRB\_RA}^{lowest\_index}$ among PRBs in a first slot to which the PUSCH is mapped, a cyclic shift field $n_{DMRS}$ for an uplink demodulation reference signal (DMRS), and a parameter regarding an orthogonal code cover (OCC), wherein the PHICH resource is determined based on Equation:

$$n_{PHICH}^{group}=(I_{PRB\_RA}^{lowest\_index}+n_{DMRS}+n_{OCC})\bmod N_{PHICH}^{group}+I_{PHICH}N_{PHICH}^{group}$$

$$n_{PHICH}^{seq}=(\lfloor I_{PRB\_RA}^{lowest\_index}/N_{PHICH}^{group}\rfloor+n_{DMRS}+n_{OCC})\bmod 2N_{SF}^{PHICH},$$

where $n_{PHICH}^{group}$ is an index of a PHICH group, $n_{PHICH}^{seq}$ is an orthogonal sequence index in the PHICH group, $n_{DMRS}$ is the cyclic shift field for the uplink DMRS, $N_{SF}^{PHICH}$ is a size of a spreading factor (SF), $I_{PRB\_RA}^{lowest\_index}$ is the lowest PRB index among PRBs in a first slot to which the PUSCH is mapped, $n_{OCC}$ is an OCC index which is the parameter regarding the OCC, $N_{PHICH}^{group}$ is the number of PHICH groups, and $I_{PHICH}$ is a value 0 or 1 and wherein $n_{OCC}$ is either 0 or 1.

6. A method of transmitting an acknowledgement/non-acknowledgement (ACK/NACK) signal in a multi-antenna system, the method comprising:

generating a plurality of physical hybrid-ARQ indicator channel (PHICH) sequences;

mapping the plurality of generated PHICH sequences to PHICH resources; and transmitting the plurality of mapped PHICH sequences to a plurality of user equipments, wherein the PHICH resources are determined based on a lowest physical resource block (PRB) index $I_{PRB\_RA}^{lowest\_index}$ among PRBs in a first slot to which respective physical uplink shared channel (PUSCH) corresponding to the respective PHICH sequence are mapped, a cyclic shift field $n_{DMRS}$ for an uplink demodulation reference signal (DMRS), wherein the PHICH resources do not overlap with each other, wherein the PHICH resources are determined based on a parameter regarding an orthogonal code cover (OCC) applied to the respective PHICH sequence, wherein the PHICH resources are determined based on Equation:

$$n_{PHICH}^{group} = (I_{PRB\_RA}^{lowest\_index} + n_{DMRS} + n_{OCC}) \bmod N_{PHICH}^{group} + I_{PHICH} N_{PHICH}^{group}$$

$$n_{PHICH}^{seq} = (\lfloor I_{PRB\_RA}^{lowest\_index} / N_{PHICH}^{group} \rfloor + n_{DMRS} + n_{OCC}) \bmod 2N_{SF}^{PHICH},$$

where $n_{PHICH}^{group}$ is an index of a PHICH group, $n_{PHICH}^{seq}$ is an orthogonal sequence index in the PHICH group, $n_{DMRS}$ is the cyclic shift field for the uplink DMRS, $N_{SF}^{PHICH}$ is a size of a spreading factor (SF), $I_{PRB\_RA}^{lowest\_index}$ is the lowest PRB index among PRBs in a first slot to which the PUSCH is mapped, $n_{OCC}$ is an OCC index which is the parameter regarding the OCC, $N_{PHICH}^{group}$ is the number of PHICH groups, and $I_{PHICH}$ is a value 0 or 1, and wherein $n_{OCC}$ is either 0 or 1.

7. The method of claim 6, wherein the parameter regarding the OCC is obtained through a physical downlink control channel (PDCCH) or a radio resource control (RRC) message from a base station.

8. The method of claim 6, wherein the parameter regarding the OCC is determined based on the cyclic shift field $n_{DMRS}$ for the uplink DMRS.

\* \* \* \* \*